United States Patent [19]

Nakanishi et al.

[11] Patent Number: 5,459,594
[45] Date of Patent: Oct. 17, 1995

[54] APPARATUS FOR INSPECTING ON-OFF STATES OF A SCATTERING-TYPE LIQUID CRYSTAL DISPLAY PANEL

[75] Inventors: Kunifumi Nakanishi; Masaaki Nakano; Mitsuyuki Takada; Eishi Gofuku; Mutsuhiro Shima; Toshio Ohnawa; Hirofumi Ouchida, all of Amagasaki, Japan

[73] Assignee: Mitsubishi Denki Kabushiki Kaisha, Tokyo, Japan

[21] Appl. No.: 309,971

[22] Filed: Sep. 20, 1994

[30] Foreign Application Priority Data

Jun. 1, 1994 [JP] Japan ................................ 6-120055

[51] Int. Cl.$^6$ ........................ G02F 1/1335; G02F 1/1343
[52] U.S. Cl. .................... 359/49; 359/54; 359/36; 359/62; 324/770
[58] Field of Search ............................. 359/49, 54, 36, 359/62; 324/555, 638, 770

[56] References Cited

FOREIGN PATENT DOCUMENTS 4-311924  11/1992  Japan .

*Primary Examiner*—Anita Pellman Gross
*Assistant Examiner*—Fetsum Abraham
*Attorney, Agent, or Firm*—Burns, Doane, Swecker & Mathis

[57] ABSTRACT

An apparatus for ON-OFF inspection on a scattering-type liquid crystal display panel is provided which is of decreased size and is capable of easily inspecting the ON-OFF states of the liquid crystal display panel by assuring enhanced visuality of an image displayed for inspection. The inspection apparatus includes: support means for supporting the liquid crystal display panel; signal applying means for applying an electric signal to a pixel of the liquid crystal display panel; illumination means for illuminating the liquid crystal display panel, the illumination means comprising a flat photoconductive member and a light source mounted on a side wall of the photoconductive member; a light-absorptive layer disposed on one side of the photoconductive member with a gap therebetween; and means for making the other side of the photoconductive member come into close contact with the liquid crystal display panel.

14 Claims, 17 Drawing Sheets

APPARATUS FOR INSPECTING ON-OFF STATES OF A SCATTERING-TYPE LIQUID CRYSTAL DISPLAY PANEL

BACKGROUND OF THE INVENTION

The present invention relates to an apparatus for inspecting ON-OFF states of a scattering-type liquid crystal display panel prior to mounting driving ICs (hereinafter referred to as "ON-OFF inspection apparatus"). More particularly, it relates to such ON-OFF inspection apparatus which is decreased in size by adopting direct viewing inspection.

The active-matrix drive liquid crystal display panel which uses a thin film transistor (hereinafter referred to as "TFT") as a switching element for each pixel comprises a TFT array substrate having a matrix array of TFTs, a counterpart substrate disposed in opposing relation the TFT substrate, and a liquid crystal material sealedly sandwiched between the two substrates. The TFT array substrate includes a glass substrate, scanning lines and data lines which are wired on the glass substrate as defining a matrix pattern, and a TFT serving as a switching element and a transparent electrode which are provided in each intersecting portion of the scanning lines and the data lines. The counterpart substrate includes a transparent electrode formed over the entire surface of the substrate, and a light-shielding film formed between each adjacent pair of pixels.

This liquid crystal display panel is composed of preparing the TFT array substrate and the counterpart substrate by respective thin film formation processes and patterning processes, disposing the two substrates in opposing relation to each other to define a predetermined gap therebetween, and introducing the liquid crystal material into the gap. Thereafter, an IC for driving TFTs is mounted on the liquid crystal display panel by TAB or COG method. Inspection takes place at each step until the product is completed. Among the inspections, the inspection on the liquid crystal display panel prior to the mounting of the IC is of great importance since it enables optical evaluation on the characteristics of the liquid crystal display panel itself. In addition, this inspection allows defective panels to be eliminated and, hence, only non-defective liquid crystal display panels are subjected to mounting of a driving IC. This leads to effective utilization of expensive driving ICs.

FIG. 26 is a schematic representation of a conventional ON-OFF inspection apparatus for a liquid crystal display panel just prior to the mounting of a driving IC. Liquid crystal display panel 101, prior to being subjected to the mounting of the driving IC, is fixed on a rigid body (not shown) with high precision. The scanning lines and data lines of the panel 101 respectively connect to the corresponding terminal electrodes (not shown) to be connected to the driving IC later while connecting to inspection terminal electrodes $102_{S1}$, $102_{S2}$, $102_{G1}$ and $102_{G2}$ disposed on four sides of the image display area. The suffixes S1, S2 and G1, G2 herein are meant to indicate electrodes for the data lines and those for the scanning lines, respectively. The terminal electrode $102_{S1}$ or $102_{S2}$ include terminals equal in number to the date lines. Likewise, the terminal electrode $102_{G1}$ or $102_{G2}$ include terminals equal in number to the scanning lines. Inspection probe pins $103_{S1}$, $103_{S2}$, $103_{G1}$ and $103_{G2}$ include pins equal in number and pitch to the terminal electrodes $102_{S1}$, $102_{S2}$, $102_{G1}$ and $102_{G2}$, respectively. Back light unit 104 includes a fluorescent lamp 105 and a diffusion plate 106. In the ON-OFF inspection on the liquid crystal display panel, the probe pins $103_{S1}$, $103_{S2}$, $103_{G1}$ and $103_{G2}$ are coming into contact with the inspection terminals $102_{S1}$, $102_{S2}$, $102_{G1}$ and $102_{G2}$, respectively, with high pecision. Signals are then input to the scanning lines and the data lines to cause the image display area to display a desired image, while the panel 101 is illuminated with diffused light emitted from the back light 104 disposed on the back side of the panel 101. The image thus formed is checked for a defect on a pixel or line basis either visually or by the use of a stereoscope or a TV camera.

The liquid crystal material for use in the liquid crystal display panel 101 is typically a twisted nematic (hereinafter referred to as "TN" simply) liquid crystal material, and the panel 101 is sandwiched by a pair of polarizers. In recent years, however, a light bulb of a projection-type LCD system has been employed a liquid crystal display panel of the type using a scattering-type liquid crystal material which assures a bright projected image since such light bulb dispenses with polarisers. In this liquid crystal display panel using the scattering-type liquid crystal material, pixels are ON-OFF controlled on the basis of the variation in transmission-scattering characteristics of the liquid crystal material against light. Therefore, the use of the aforementioned back light emitting diffused light renders the ON-OFF states of the image difficult to differentiate from each other, thus bringing a great difficulty in the ON-OFF inspection on the liquid crystal display panel.

To solve this problem, Japanese Unexamined Patent Publication No. 248435/1992 has proposed an LCD panel inspection apparatus as shown in FIG. 27. In this figure, there are shown a liquid crystal display panel 101, a projector 107, a reflecting mirror 108, a projection lens 109, a screen 110, a signal-generating circuit 111, and a drive-signal line 112. If the panel is an LCD panel using a scattering-type liquid crystal, polarlizers 113 are unnecessary. Light outgoing from the projector 107 is converged so that the beam diameter thereof at the opening of the projection lens 109 is substantially the same diameter of the opening of the projection lens 109.

Reference is then made to the operation of such an apparatus when used to inspect a liquid crystal display panel using a scattering-type liquid crystal. When the liquid crystal is in the transmissive condition, light outgoing from the projector 107 is reflected toward the projection lens 109 by the reflecting mirror 108, is directly incident on the opening of the projection lens 109, and reaches the screen 110, thereby increasing the luminance of the screen 110. On the other hand, when the liquid crystal is in the scattering condition, light outgoing from the projector 107 is scattered by the liquid crystal and hence will not be incident on the opening of the projection lens 109 and will not reach the screen 110. This results in the screen of a relatively low luminace. In this way the difference between the transmissive and scattering conditions of the liquid crystal is visually recognized as the difference in the luminance of the screen.

The conventional ON-OFF inspection apparatus for a liquid crystal display panel prior to the mounting of a driving IC is thus constructed and hence is required to form a projection optical system for inspecting a liquid crystal display panel using a scattering-type liquid crystal. This results in the apparatus of immense dimension.

The present invention has been attained to overcome the problems associated with the prior art. It is, therefore, an object of the present invention to provide an apparatus for inspecting a scattering-type liquid crystal display panel which is minimized in size, enhances the visuality of a display image to be inspected, and facilitates ON-OFF inspection on the scattering-type liquid crystal display panel.

SUMMARY OF THE INVENTION

To attain the foregoing objects, the present invention provides an apparatus for inspecting ON-OFF states of a scattering-type liquid crystal display panel, comprising: support means for supporting the liquid crystal display panel; signal applying means for applying an electric signal to a pixel of the liquid crystal display panel; illumination means for illuminating the liquid crystal display panel, the illumination means comprising a flat photoconductive member and a light source mounted on a side wall of the photoconductive member; a light-absorptive layer disposed on one side of the photoconductive member with a gap therebetween; and a means for biassing the other side of the photoconductive member so as to be closely contact with the liquid crystal display panel.

Preferably, the support means comprises a rigid body having a rectangular opening in a central portion thereof adapted to receive the liquid crystal display panel, the rectangular opening being fitted around the flat photoconductive member; and the means for biassing the other side of the photoconductive member so as to be closely contact with the liquid crystal display panel comprises pressing means for pressing the photoconductive member against the liquid crystal display panel. With this arrangement, the liquid crystal display panel is assuredly supported only by the rigid body, while the clearance between the photoconductive member and the liquid crystal display panel which would usually be defined because of uneven surfaces thereof is prevented from appearing.

Preferably, the rigid body has a hollow portion surrounding the opening and is adapted to fix the liquid crystal display panel thereto by drawing the panel against the rigid body by suction through the hollow portion. With this arrangement, by providing a reduced pressure to the hollow portion only when the liquid crystal display panel is inspected, the panel is drawn against the rigid body by suction and hence is assuredly fixed thereto.

The flat photoconductive member preferably has a hollow portion through which the liquid crystal display panel is to be drawn against the photoconductive member by suction so as to be fixed securely. With this arrangement, the liquid crystal display panel is securely fixed because of negative pressure, while the clearance between the photoconductive member and the liquid crystal display panel which would usually be defined because of uneven surfaces thereof is prevented from appearing.

The flat photoconductive member preferably comprises a transparent rigid material and a transparent resin. The photoconductive member thus formed has a firm surface to be coming into contact with the liquid crystal display panel and thereby offers an improved durability.

The flat photoconductive member preferably has a portion corresponding to the image display area of the liquid crystal display panel, the portion being thicker than the rest of the photoconductive member. Such photoconductive member assures an enlarged area in which the light source and the light-absorptive layer are mounted.

The flat photoconductive member is preferably provided with a reflecting plate disposed as surrounding side walls of the thicker portion with a reflecting surface thereof facing the photoconductive member. With such photoconductive member, even rays of light from the light source which are reflected by the reflecting plate are then made to be applied onto the image display area of the liquid crystal display panel. This will facilitate inspection on the visuality of an image displayed.

The flat photoconductive member is preferably adapted to be coming into close contact with the liquid crystal display panel through an intermediate transparent liquid. Even if a slight clearance is defined between the photoconductive member and the liquid crystal display panel, such clearance is filled with the transparent liquid and hence virtually disappears. This results in a facilitated ON-OFF inspection.

Instead of the transparent liquid, a transparent resilient member may be provided between the flat photoconductive member and the liquid crystal display panel. The provision of the resilient member allows the photoconductive member and the liquid crystal display panel to come into close contact with each other with no formation of an air layer therebetween while eliminating the step of introducing the transparent liquid dropwise. This also results in a facilitated ON-OFF inspection.

The flat photoconductive member preferably defines a recessed portion in a flat portion thereof adapted to contact the liquid crystal display panel, the recessed portion being adapted to be filled with a transparent liquid. This allows the photoconductive member and the liquid crystal display panel to come into close contact with each other with no formation of air layer therebetween while preventing fine particles existing therebetween from adhering to the photoconductive member or the panel.

Further, the flat photoconductive member is preferably provided with a supply path for supplying the transparent liquid to the recessed portion and defines an air vent groove in the flat surface thereof to be contacted with the liquid crystal display panel. This eliminates the step of introducing the transparent liquid dropwise, permits the photoconductive member and the liquid crystal display panel to come into complete close contact with each other with no formation of air layer therebetween, and facilitates the ON-OFF inspection.

Preferably, the support means comprises a rigid body having a U-shaped opening in a surface for receiving the liquid crystal display panel, the U-shaped opening being adapted to fit around the photoconductive member, and the photoconductive member has a portion extending beyond the liquid crystal display panel in a placed position when viewed in section parallel to the plane of the panel. Such arrangement permits the liquid crystal display panel and the photoconductive member to come into close contact with each other with no formation of an air layer therebetween and the liquid crystal display panel to be oblique with respect to the horizontal plane for easy inspection.

Preferably, the light source comprises a plurality of different color light sources each mounted on one side wall of the flat photoconductive member, and a dichroic mirror is disposed on a side wall in opposing relation to each of the light color sources so as to reflect color light emitted from the light source on the opposite side wall. This allows light rays of different colors to be applied onto the scattering-type liquid crystal display panel.

Further, the signal applying means is preferably provided with a voltage adjusting means for varying the effective voltage of a pixel portion, and a means for measuring the luminance of the pixel portion is provided to the apparatus. This makes it possible to assuredly recognize the optical characteristics of the pixel portion.

The ON-OFF inspection apparatus for a scattering-type liquid crystal display panel according to the present invention is so constructed that the flat photoconductor member having a light source on a side wall thereof and the light-absorptive layer on the bottom thereof is coming into contact with the liquid crystal display panel only when the inspection is to be carried out. This construction allows light emitted from the light source to effectively pass through only the pixels assuming the scattering condition while preventing light from passing through the pixels assuming the transmitting condition. Therefore, the visuality of the displayed image can be enhanced, while fitting and removal of the liquid crystal display panel can be facilitated.

DETAILED DESCRIPTION

The present invention will now be described in detail with reference to the drawings.

Example 1

Figure 1:
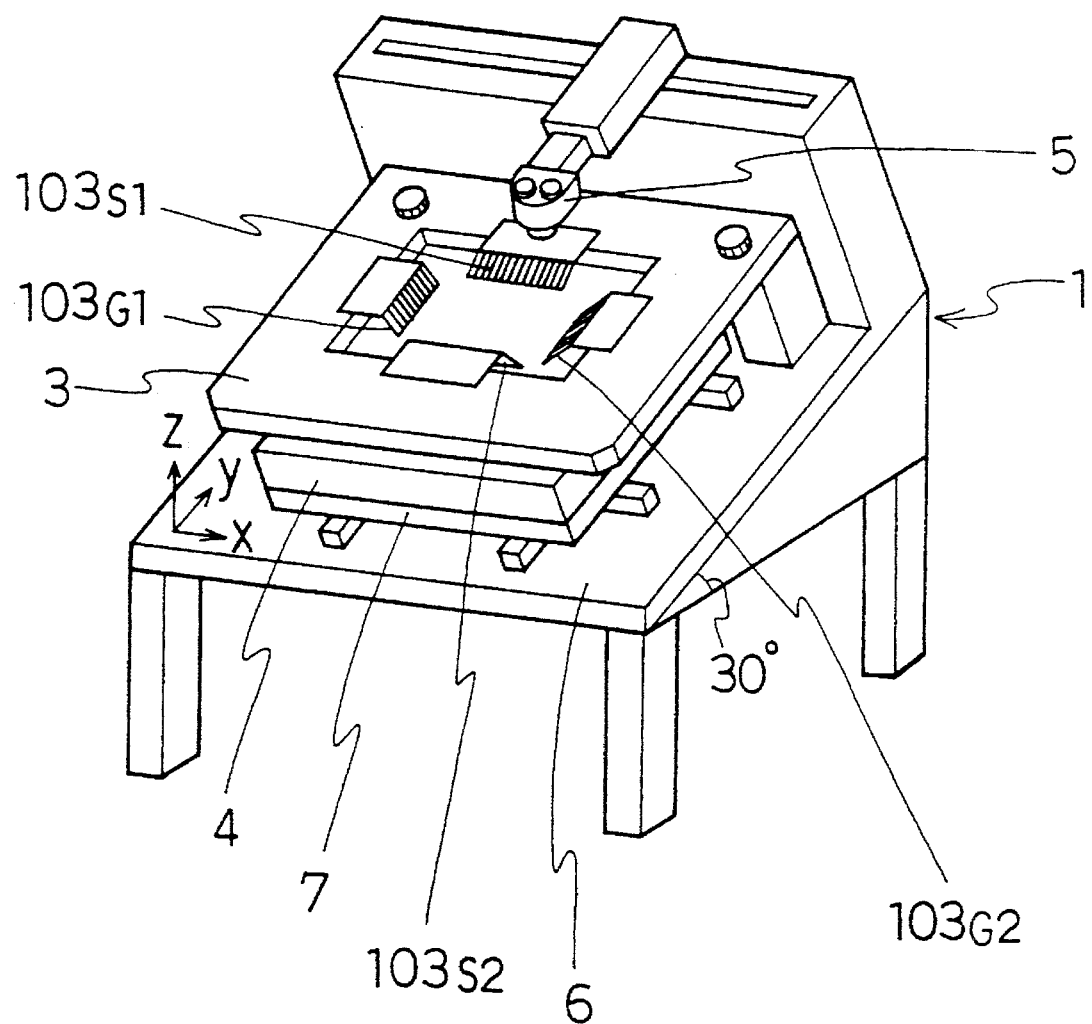
FIG. 1 is a perspective view of Example 1 of an inspection apparatus according to the present invention.

Referring to FIG. 1, an inspection apparatus 1 according to Example 1 of the present invention includes probe pins $103_{S1}$, $103_{S2}$, $103_{G1}$ and $103_{G2}$ each serving as a means for applying a signal to a terminal (not shown) of a liquid crystal display panel and each having the same number of pins as the terminal electrodes connected to data lines or scanning lines on the panel. The suffixes S1,S2 and G1,G2 are used to be associated with the data lines and the scanning lines, respectively. The inspection apparatus 1 further includes a probe base 3 supporting the probe pins, a chuck unit 4 for fixedly supporting the liquid crystal display panel, a stereomicrometer 5 for verifying the positioning of the probe pins and for inspecting the ON-OFF states of the panel, and a base 6 of the inspection apparatus 1 which is slanted about 30° with respect to the horizontal plane and on which the chuck unit 4 is mounted with a stage intervening therebetween. Assuming X–Y–Z axes on the plane of the base 6, the stage 7 is movable along X axis, Y axis and at angle θ in the X–Y plane and, thus, the chuck unit 4 is movable in the direction X–Y–θ. The probe base 3 is disposed parallel to the plane of the base 6 as sandwitching therebetween the stage 7 and the chuck unit 4.

Figure 2:
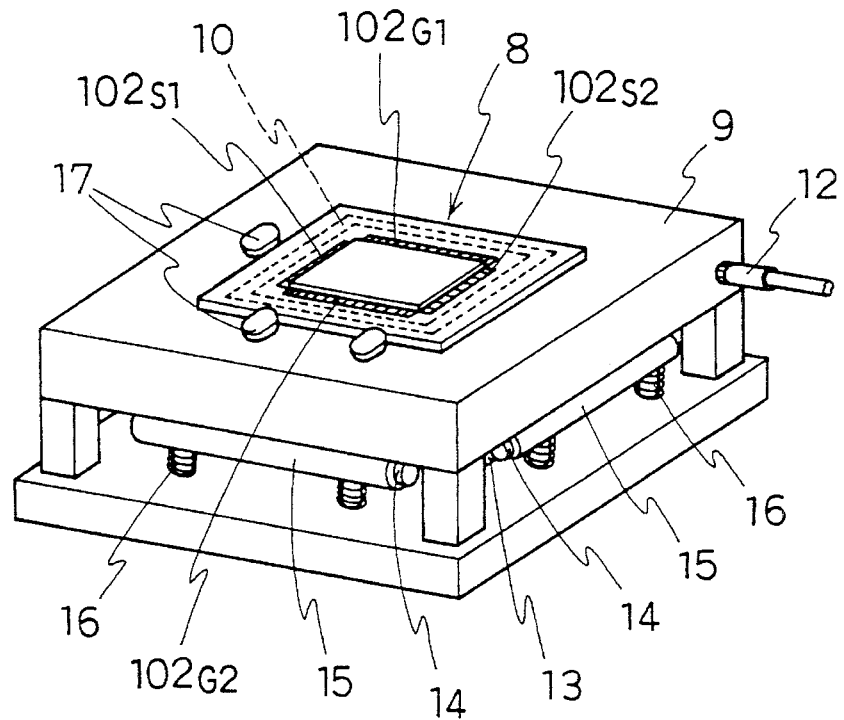
FIG. 2 is a perspective view showing the chuck unit of Example 1 of the inspection apparatus according to the present invention.
Figure 3:
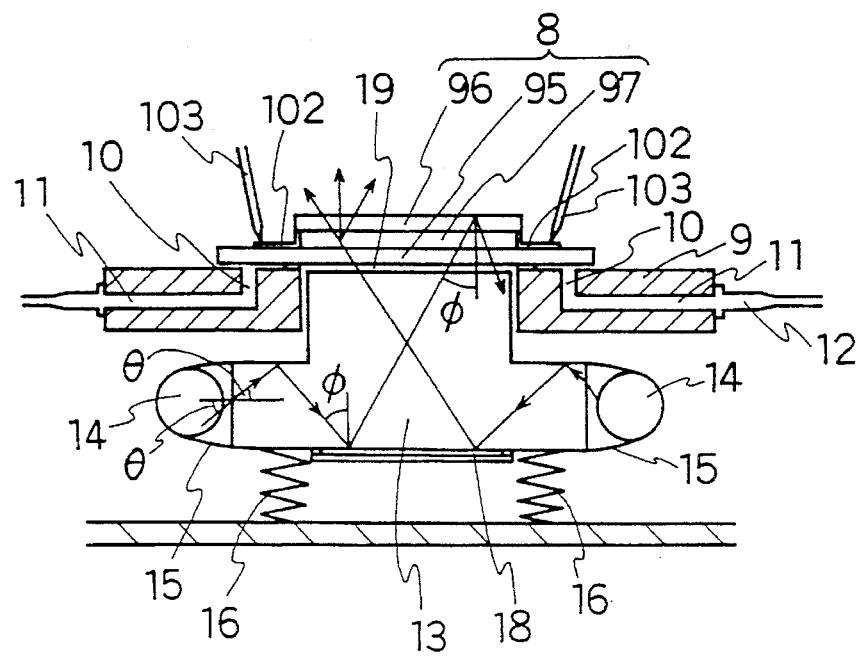
FIG. 3 is a sectional view of the chuck unit for illustrating Example 1 of the inspection apparatus according to the present invention.

The chuck unit 4 is shown in perspective at FIG. 2 and in section at FIG. 3. In FIGS. 2 and 3, numeral 8 denotes a scattering-type liquid crystal display panel which is inspected for its ON-OFF states, numeral 9 a table of a rigid material serving as a support means for carrying the liquid crystal display panel 8, numeral 11 a groove serving as a member for reducing pressure, numeral 10 a tunnel, numeral 12 a vacuum pipe, numeral 13 a flat photoconductive member, numeral 14 a light source, numeral 15 a reflecting plate in the form of film, numeral 16 a spring serving as a biassing means, numeral 17 a guide, numeral 18 a light-absorptive sheet, and numeral 19 water.

An illumination means comprises the flat photoconductive member 13 and the light source 14. Note that the flat photoconductive member 13 herein is meant to include one having a thick portion as shown in FIG. 3.

The scattering-type liquid crystal display panel 8, similar to that described in Japanese Unexamined Patent Publication No. 96714/1990, comprises a pair of transparent substrates 95 and 96 and a liquid crystal material 97 sealedly sandwiched between the substrates 95,96, the liquid crystal material 97 containing a liquid crystal dispersedly held in a polymer (hereinafter simplified as "PDLC"). The liquid crystal display panel 8 is of the active-matrix type comprising the transparent substrate 95 provided with an active element such as TFT (not shown), interconnection lines defining a matrix pattern and a transparent electrode provided to each pixel and the transparent substrate 96 entirely covered with a transparent electrode; or of the simple-matrix type comprising the transparent substrates 95, 96 having striped transparent electrodes crossing perpendicular to each other. Terminal electrode groups $102_{S1}$, $102_{S2}$, $102_{G1}$ and $102_{G2}$ are provided on the panel 8 and each comprise the same number of terminals as the scanning lines or signal lines.

The table 9 is a supporting means comprising a rigid body for carrying the liquid crystal display panel 8. In this example, the table 9 is a table made of stainless steel and has a high degree of planarity given to the surface to be coming into contact with the liquid crystal display panel. The table 9 may be made of aluminum, brass or the like, as well as of stainless steel. The table 9 is covered with an electrically conductive coating colored black which prevents electrostatic breakdown of the TFT and shuts out incoming light. The table 9 centrally defines a rectangular opening which is slightly larger than the image display area of the panel 8 and an about 3 mm wide and about 2 mm deep rectangular groove 10 around the opening on the top surface of the table 9. This groove 10 is communicated with the vacuum pipe 12 through the tunnel 11 formed inside the table 9.

Plastic circular guides 17 are fixed on the table 9, and two of the guides carries the lower side of the panel 9 and one carries the left-hand side of the panel thereby substantially positioning the panel 8.

The flat photoconductive member (hereinafter referred to as "photoconductive member") 13 is shaped convex in section and has centrally thereof a thick portion. The photoconductive member 13 is made of a transparent resin such as an acrylic resin or polycarbonate, or glass and has a rectangular flat top surface of a size smaller than the opening of the table 9. The all the surfaces of the photoconductive member 13 are mirror finished.

The light source 14 is used as a back light and comprises four hot cathode type fluorescent lamps disposed on lower four sides of the photoconductive member 13. The reflecting plate 15 is in the form of film and is adapted to reflect light from the light source 14 thereby to efficiently utilize light of the light source 14.

The spring 16 has a sufficient resilience to support the photoconductive member 14 and the light source 14 comprising the fluorescent lamps. The resilience of the spring 16 is adjusted so that the top surface of the photoconductive member 13 projects about 1 mm from the flat surface of the table 9 in unloaded condition while in slightly loaded condition the top surface thereof is readily lowered to be flush with the flat surface of the table 9.

The light-absorptive sheet 18 has a black velvet cloth on the photoconductive member side so as to absorb light and is bonded to the periphery of the photoconductive member 13 with an air layer intervening thereby by means of an adhesive tape or the like. The gap defined between the liquid crystal display panel 8 and the photoconductive member 13 is filled with water 19 such as high purity water or tap water to expel air layer from the gap. The means for biassing the photoconductive member 13 and the liquid crystal display panel 8 so as to be closely contact with each other comprises the water 19 and the pressing means 16.

Reference is then made to the operation of the inspection apparatus 1. First, the probe base 3 is raised and then several drops of water 19 are dropped on the top surface of the photoconductive member by means of, for example, an injector. The liquid crystal display panel prior to the mounting of ICs is gently pressed against the top surface of the photoconductive member 13 so as not to form an air layer therebetween and fixed to the apparatus as aligned with the guides 17. In turn, the pressure within the tunnel 11 and the groove 10 are reduced through the vacuum pipe 12, and the panel 8 is pressed against the flat surface of the table 9, thereby drawing the panel 8 against the table 9 by vacuum. This allows the panel 8 to be assuredly fixed onto the table 9 while pressing the photoconductive member 13 against the panel 8 by means of the spring 16. Thus, the photoconductive member 13 is coming into close contact with the panel 8 through the water 19 with no formation of an air layer therebetween. By moving the X–Y–θ stage 7 while observing the panel through the stereomicrometer 5, the probe pins $103_{S1}$, $103_{S2}$, $103_{G1}$ and $103_{G2}$ are respectively registered with the terminal electrodes $102_{S1}$, $102_{S2}$, $102_{G1}$ and $102_{G2}$ on the panel 8.

Subsequently, the probe base 3 is lowered to bring the probe pins $103_{S1}$, $103_{S2}$, $103_{G1}$ and $103_{G2}$ into contact with the corresponding terminal electrodes $102_{S1}$, $102_{S2}$, $102_{G1}$ and $102_{G2}$ on the panel 8. In turn, data signals are applied to the data signal lines from the probe pins $103_{S1}$ and $103_{S2}$, while scanning signals are applied to the scanning signal lines from the probe pins $103_{G1}$ and $103_{G2}$. Thus a desired image is displayed on the image display part of the liquid crystal display panel 8.

The principle of visualization of a displayed image according to the present invention will be described with reference to FIG. 3. If the refractive index of the photoconductive member 13 is 1.5, then the light rays, which are emanated or diverged from the light source 14 and are incident on a side wall of the photoconductive member at an incident angle of θ, advance in the photoconductive member according to Snell laws of refraction, or at an angle determined by the following equation:

$$\theta' = \sin^{-1}\{(\sin\theta)/1.5\}$$

Here, θ=−90° to 90°, therefore, θ'=−42° to 42°.

The thus advancing light rays are incident on the top and bottom surfaces, perpendicular to the first incident surface, of the photoconductive member 13 at an angle |φ|=48° to 90° with respect to a normal line to each surface. Since this incident angle is larger than the critical angle (42°) of the photoconductive member and air, the light rays are totally reflected by those surfaces and further advance in the photoconductive member. These light rays then reach the convex portion of the photoconductive member, and advance straight to the surface of PDLC 97 of the image display part since the water 19 and the transparent substrate 95 have substantially the same refractive index as the photoconductive member.

As in Japanese Unexamined Patent Publication No. 96714/1990, the scattering-type liquid crystal display panel inspected in the present invention is so designed that a pixel thereof is ON-OFF controlled on the basis of the variation in transmission-scattering characteristics of the pixel with the variation in the voltage applied. Stated otherwise, in the PDLC 97 existing in a pixel portion of the image display part which is applied with a sufficient voltage, liquid crystal particles and the polymer have the same refractive index and, hence, a refractive index discontinuous interface is not present. Accordingly, the light rays passing through the PDLC 97 advance straight and reach the top surface of the upper substrate 96 of the panel 8. Since the incident angle of the light rays at this surface is also larger than the critical angle formed by the photoconductive member and air, or 42°, the light rays are totally reflected by this surface and will not be emitted from the panel 8. For that reason, when the panel 8 is viewed, only the surface of the light-absorptive sheet 18 disposed on the bottom surface of the photoconductive member 13 is observed. Since the light rays emitted from the light source 14 are totally reflected by the surfaces of the photoconductive member as described above, the surface of the light-absorptive sheet 18 does not receive these light rays. Further, since the light-absorptive sheet 18 absorbs light rays incoming from the outside and incident on the panel 8, the surface of the light-absorptive sheet 18 is viewed as a black surface with low luminance.

On the other hand, a refractive index discontinuous interface is present in the PDLC layer 97 existing in a pixel portion of the image display part which is not applied with a voltage. Hence, the PDLC layer 97 assumes a condition to scatter light, and light rays advancing straight to the PDCL layer 97 in that pixel portion are scattered in various directions, so that some of light rays are emitted to the atmosphere from the upper surface of the liquid crystal display panel 8. In this case, the panel 8 is viewed to be bright. According to this principle, the pixel in which PDLC 97 is in the transmissive condition and the pixel in which PDLC 97 is in the scattering condition show a high dark-light contrast and hence can be clearly distinguished from each other. This enables detection of a defective pixel or a break in the liquid crystal display panel 8.

When the ON-OFF inspection on the liquid crystal display panel is thus finished, the probe base 3 is raised and then the valve (not shown) connected to the vacuum pipe 12 is closed. Then, the negative pressure applied between the panel 9 and the table 9 is released, causing the photoconductive member 13 together with the panel 13 to be raised by the biassing force due to the spring 16. The panel 8 in this condition can readily be removed from the photoconductive member 13.

As described above, the ON-OFF inspection apparatus 1 for the scattering-type liquid crystal display panel 8 is adapted to bring the illumination optical system, or the photoconductive member 13 having the light source 14 on each side wall into close contact with the liquid crystal display panel 8 through water 19. Therefore, the apparatus 1 is constructed without any projection optical system. This results in the apparatus 1 of reduced size which is capable of obtaining a displayed image of high contrast. In addition, the panel 8 is fixedly placed on the table 9 having a rigidity by suction, while the photoconductive member 13 is coming into close contact with the panel 8 with no formation air layer therebetween. Such an arrangement permits the panel 8 to be fixed with high precision while facilitating the removal thereof from the apparatus 1.

It should be understood that although the present example uses the probe pins as the means for applying signals to the terminals of the liquid crystal display panel, such means may comprise spring pins or electrically conductive rubber member. Further, although the water 19 is used to make the photoconductive member 13 and the panel 8 come into close contact with each other so as not to form an air layer therebetween, the use of high purity water instead of the water 19 would prevent abnormal fine particles from being introduced and the photoconductive member from degrading due to chemical action.

Example 2

Figure 4:
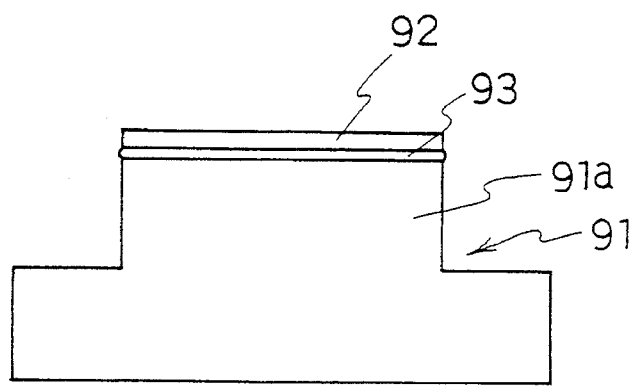
FIG. 4 is a sectional view of the transparent photoconductive member of Example 2 of the insepction apparatus according to the present invention.

FIG. 4 is a sectional view of another example of the photoconductive member 13 for illustrating second example of the inspection apparatus according to the present invention. In FIG. 4, the body of a photoconductive member 91 is made of a transparent acrylic resin and is shaped similar to the photoconductive member 13 of Example 1 but has a thick portion 91a having a thickness (or height) about 1 mm smaller than that of the photoconductive member 13. A glass plate 92 is about 1 mm thick and is shaped same as the top surface of the convex portion of the photoconductive member 13. The glass plate 92 is bonded to the photoconductive member 91 with a transparent adhesive 93 having a refractive index substantially equal to those of the photoconductive member 91 and glass plate 92. The transparent adhesive 93 comprises, for example, 2-component addition reaction type silicone RTV resin (KE1603A/B, a product of Shin-Etsu Chemical Co., Ltd. ). The glass plate 92 and the photoconductive member 91 are continuous through the transparent adhesive 93 with no intervention of air layer. Other features of Example 2 are the same as those of Example 1.

The present example functions in the same way as the Example 1 since the glass plate 92, photoconductive member 91 and transparent adhesive 93 have substantially the same refractive index. With this arrangement, the surface to be contacted with the panel is formed of the glass plate and hence is hard to damage even though contacted with the panel many times. In addition, the use of the glass plate will not make the photoconductive member so heavy.

It should be understood that a quartz plate may be bonded to the top surface of the photoconductive member instead of the glass plate.

Example 3

Figure 5:
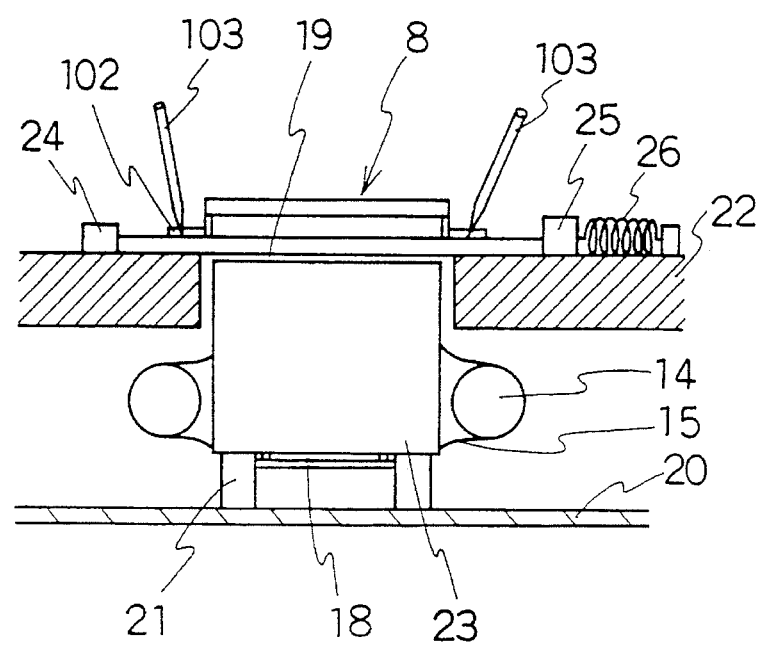
FIG. 5 is a sectional view of the chuck unit of Example 3 of the inspection apparatus according to the present invention.
Figure 6:
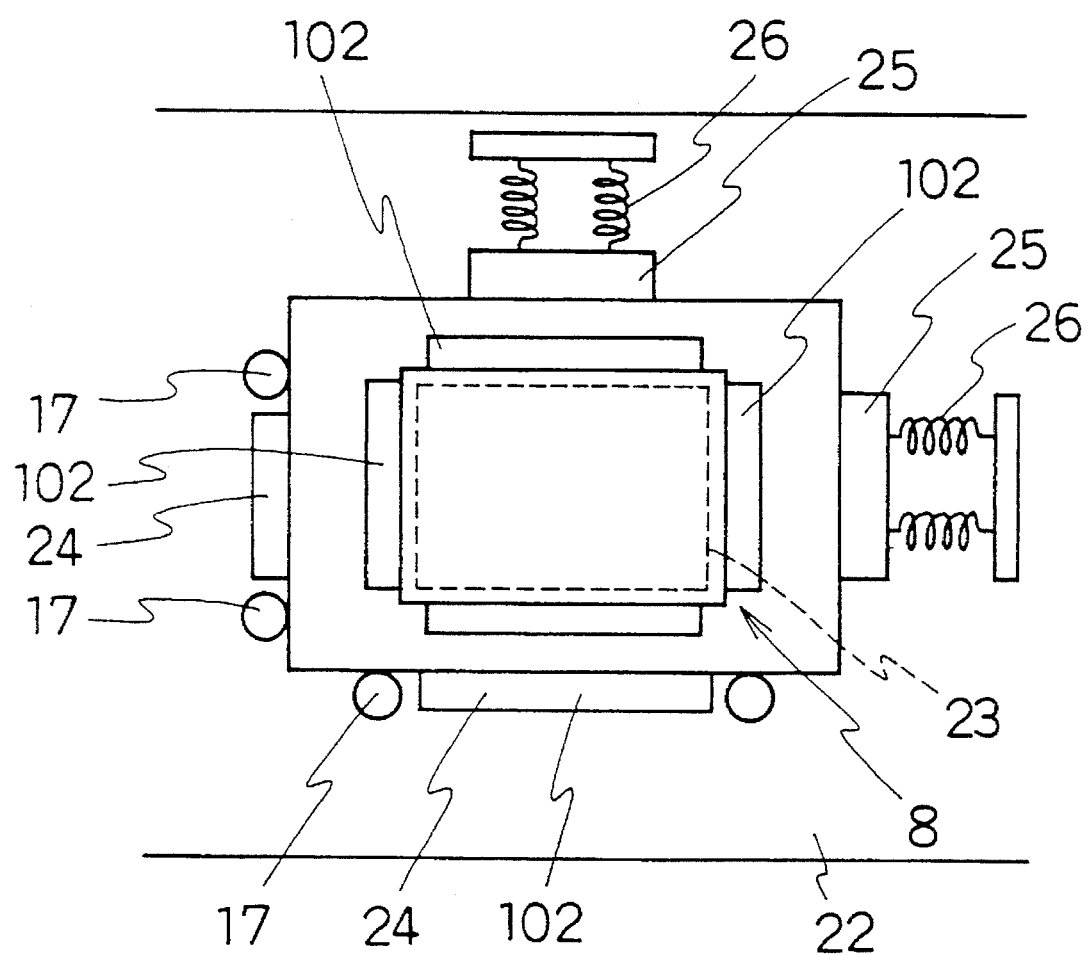
FIG. 6 is a plan view of the chuck unit shown in FIG. 5.

FIG. 5 is a sectional view of the chuck unit 4 of the inspection apparatus shown in FIG. 1 for illustrating third example of the present invention. FIG. 6 is a top plan view of FIG. 5. This example is substantially the same as Example 1 except for the feature of the chuck unit. Numerals 102, 103, 8, 14, 15 and 18 are used to denote same parts of Example 1.

In FIG. 5, a table 22 for carrying the liquid crystal display panel is similar in outside form to the table 9 of Example 1 but does not define a groove or tunnel for reducing pressure. A photoconductive member 23 is made of a transparent acrylic resin and is shaped rectangular parallelepiped. When viewed in top plan, the photoconductive member 23 is shaped rectangular and sized slightly larger than the image display part of the liquid crystal display panel 8. This photoconductive member 23 is so fixed to a bottom plate 20 of the chuck unit by means of a support member 21 that the top surface thereof is positioned about 0.1 mm lower than the flat surface of the table 22. The gap defined between the panel 8 and the photoconductive member 23 is filled with high purity water 19. Circular guides 17 are fixed to the table 22, two for positioning the lower side of the panel 8 and the other two for positioning the left-hand side thereof. Plastic presser plates 25 are positioned at locations corresponding to the right-hand side and upper side of the panel 8 for making the panel 8 fixedly abut against a stopper 24 by means of a spring 26 fixed to the table 22.

In inspection, the liquid crystal display panel 8 is placed on the inspection apparatus in the following manner. As in Example 1, firstly the probe base 3 is raised, followed by dropping several drops of high purity water 19 on the top surface of the photoconductive member 23. In turn, while each of the two presser plates 25 is biassed rightwardly or upwardly by hand, the liquid crystal display panel 8 is gently pressed against the photoconductive member 23 so as not to form an air layer therebetween and is aligned with the circular guides 17 and fixed. The presser plates 25 are then released from hand to make the panel 8 closely abut against the circular guides 17. Then, the panel 8 is assuredly fixed in that position. The succeeding inspection procedure and the inspection principle are the same as in Example 1.

As described above, the present example, like Example 1, enables ON-OFF inspection on the scattering-type liquid crystal display panel 8 with a displayed image of high visuality. Further, the present example is so constructed that the panel 8 is fixed using the resilience of the spring 26 and the photoconductive member 23 is fixed to the chuck unit. This results in a simplified structure of the inspection apparatus.

Example 4

Figure 7:
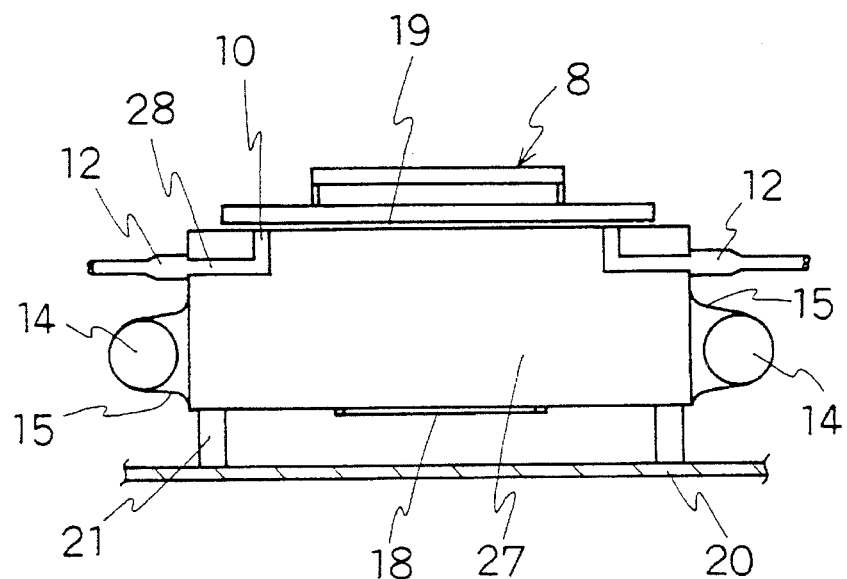
FIG. 7 is a sectional view of the chuck unit of Example 4 of the inspection apparatus according to the present invention.
Figure 8:
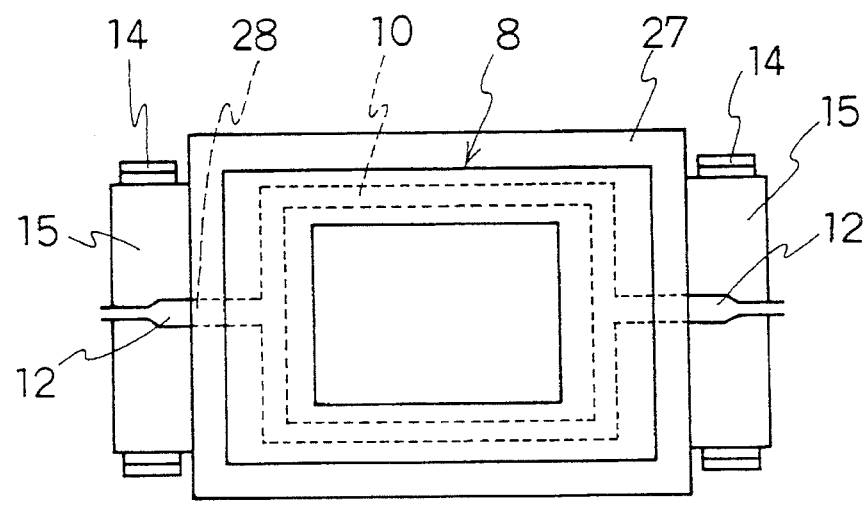
FIG. 8 is a plan view of the chuck unit shown in FIG. 7.

FIG. 7 is a sectional view of the chuck unit 4 of the fourth example of the inspection apparatus according to the present invention, and FIG. 8 is a plan view thereof. In FIGS. 7 and 8, same numerals 8, 14, 15, 18, 19 and 20 are used to denote same parts of Example 1. A photoconductive member 27 is made of a transparent acrylic resin as in Example 1 but the top surface thereof is shaped into a rectangle of a size larger than the outer size of the liquid crystal display panel 8. In addition, on the top surface of the photoconductive member 27 is provided a groove 10 defining a rectangle larger than the image display part of the panel 8 and smaller than the outer size of the panel 8. This groove 10 is about 3 mm wide and about 2 mm deep and is made to communicate with the vacuum pipe 12 through the tunnel 28 formed inside the photoconductive member 27. This photoconductive member 27 is fixed to the bottom plate 20 of the chuck unit 4 by means of the support member 21.

In inspection the liquid crystal display panel 8 is placed on the inspection apparatus in the following manner. As in Example 1, firstly the probe base 3 is raised, followed by dropping several drops of water on the top surface of the photoconductive member 27 by means of, for example, an injector. In turn, the liquid crystal display panel 8 is gently pressed against the top surface of the photoconductive member 23 so as not to form an air layer therebetween. Then, a reduced pressure is provided between the panel 8 and the photoconductive member 8 through the vacuum pipe 12 thereby drawing the panel 8 against the photoconductive member 27 by suction. In this way, the present example fixes the panel 8 and biassing the photoconductive member 27 and the panel 8 so as to be closely contact with each other at the same time and in the same plane. The inspection procedure succeeding to the above and the inspection principle are the same as in Example 1.

As described above, the present example, like Example 1, enables ON-OFF inspection on the scattering-type liquid crystal display panel 8 with a displayed image of high visuality. Further, the tunnel provided inside the photoconductive member 27 lies outside the image display area of the panel 8 and hence will not affect the visuality of the image. Furthermore, the panel 8 is biassed to be closely contact with the photoconductive member 27 in the same plane as the surface for fixing the panel. This results in the inspection apparatus of very simplified structure and assures a high precision in making the photoconductive member come into close contact with the panel 8.

Although the photoconductive member 27 is made of a transparent acrylic resin, it may be made of glass or quartz. In this case, the photoconductive member would more hardly be damaged. Further, since glass or quartz assures a higher planarity and a lower thermal deformability than the acrylic resin, the liquid crystal display panel 8 can be fixed to the inspection apparatus with a higher precision. In addition, the use of a liquid such as ethanol instead of the water provided between the panel 8 and the photoconductive member 27 will render the inspection apparatus hard to corrode because the photoconductive member 27 will never be eroded thereby.

Example 5

Figure 9:
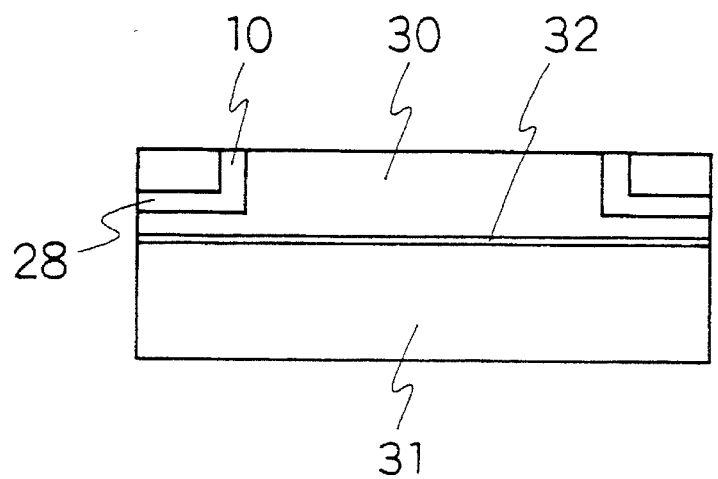
FIG. 9 is a sectional view of the transparent photoconductive member forming part of the chuck unit of Example 5 of the inspection apparatus according to the present invention.

FIG. 9 is a sectional view of the photoconductive member of fifth example of the inspection apparatus according to the present invention. The photoconductive member of the present example comprises an upper photoconductive member 30 and a lower photoconductive member 31, the upper member 30 being of glass or quartz, the lower member 31 being of a transparent acrylic resin. A groove 10 and a tunnel 28, same as those of Example 3, are provided to the upper member 30. The upper and lower members 30 and 31 are bonded to each other with no intervention of air layer therebetween by means of a transparent adhesive 32 having a refractive index substantially equal to those of the members 30 and 31. The transparent adhesive 32 may be, for example, the foregoing 2-component addition reaction type silicone RTV resin. Other features of this example are substantially the same as those of Example 4.

The present example includes the upper photoconductive member 30, lower photoconductive member 31 and transparent adhesive 32 having respective refractive indexes substantially equal to each other and, hence, offers the same optical effects as Example 4. As compared to the photoconductive member of transparent acrylic resin in Example 4, the photoconductive member in this example are hard to damage at the top surface thereof which is made to contact the liquid crystal display panel. In addition, like Example 4, the present example assures a high precision in fixing the liquid crystal display panel. Furthermore, the photoconductive member in the present example is lighter than a photoconductive member which is entirely made of glass or quartz.

Example 6

Figure 10:
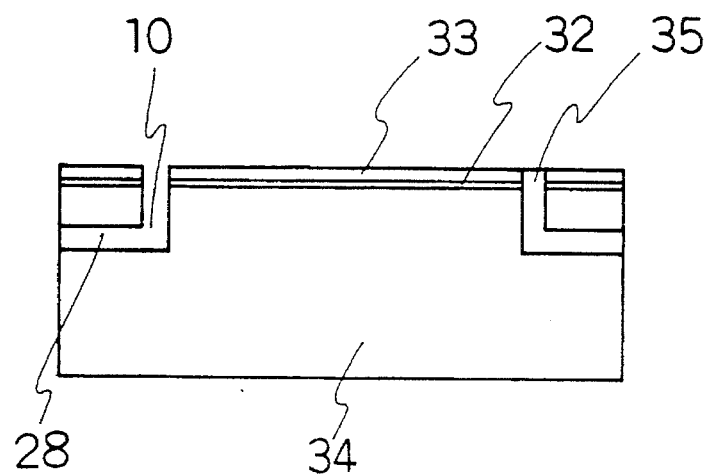
FIG. 10 is a sectional view of the transparent photoconductive member of Example 6 of the inspection apparatus according to the present invention.
Figure 11:
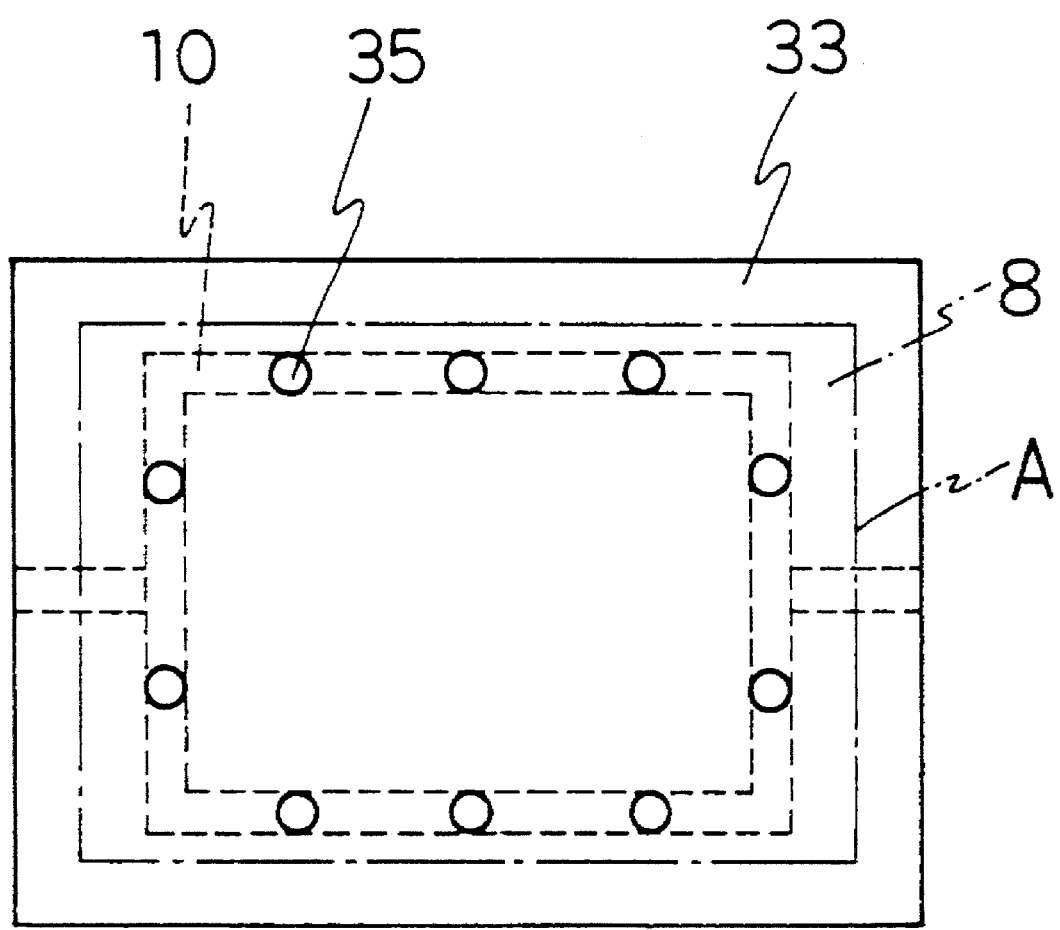
FIG. 11 is a plan view of the transparent photoconductive member shown in FIG. 10.

FIG. 10 is a sectional view of the photoconductive member of sixth example of the inspection apparatus according to the present invention, and FIG. 11 is a plan view of the photoconductive member. The photoconductive member in the present example includes a lower photoconductive member 34 defining a groove 10 and a tunnel 28 which are similar to those provided to the transparent photoconductive member 27 of Example 4 and an upper photoconductive member 33 of glass or quartz in the form of a thin plate. FIG. 11 is a plan view of the upper photoconductive member 33. In FIG. 11, chain line A depicts the contour of the liquid crystal display panel 8 as the subject for inspection, and a broken line depicts the groove 10 formed on the lower photoconductive member 34. Several through-holes 35 of about 3 mm diamter are provided to the upper member 33 at locations coincident with the groove 10. The upper member 33 formed of, for example, a glass plate is bonded to the lower member 34 by means of a transparent adhesive 32 with no intervention of air layer therebetween. Other features of the present example are substantially the same as those of Example 4.

The photoconductive member in the present example is hard to damage at the top surface portion thereof and assures a high precision in fixing the liquid crystal display panel to the apparatus since the top surface portion to be contacted with the panel is made of glass. In addition, since the glass or quartz plate is required only to be perforated, manufacture of the present apparatus is highly facilitated, compared to the case where the tunnel for suction is formed inside a glass member.

Example 7

Figure 12:
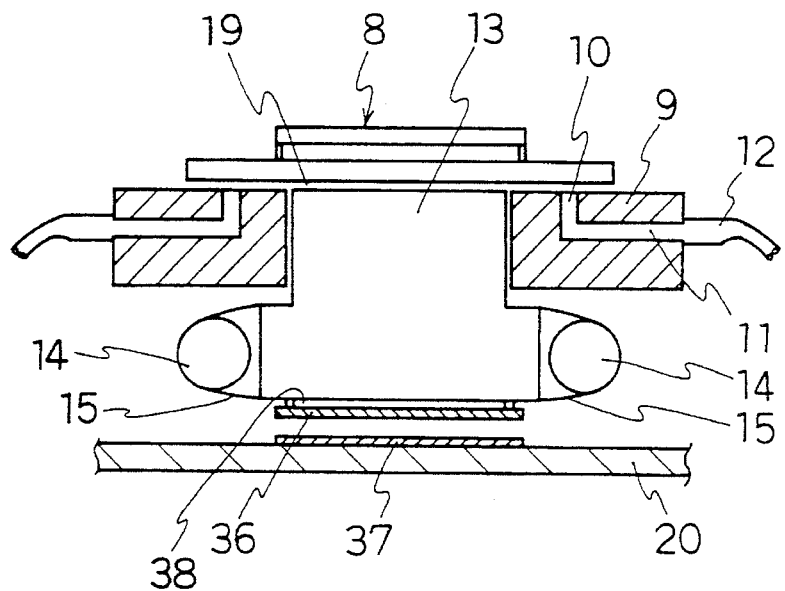
FIG. 12 is a sectional view of the chuck unit of Example 7 of the inspection apparatus according to the present invention.

FIG. 12 is a sectional view of the chuck unit of seventh example of the inspection apparatus according to the present invention. In FIG. 12, numeral 8 denotes a scattering-type liquid crystal display apparatus, and same numerals 9 through 15 and 19 are used to denote same parts of Example 1. Homopolar black magnets 36 and 37 in the form of flat plate serves as a means for pressing the photoconductive member 13. The magnet 36 is disposed on the bottom surface of the photoconductive member 13 with intervention of air layer therebetween, while the magnet 37 is fixed to the bottom plate 20 of the chuck unit. Repulsive force exerted between the two magnets 36 and 37 is adjusted so that in unloaded condition the top surface of the photoconductive member 13 projects beyond the flat surface of the table 9 by about 1 mm while in slightly downwardly loaded condition it lowers to the same level as the flat surface of the table 9. The clearance defined between the convex portion of the photoconductive member 13 and the table 9 is 0.5 mm or less. The photoconductive member 13 is adapted to rise and lower perpendicularly to the surface of the liquid crystal display panel 8.

The liquid crystal display panel 8 is positioned on the inspection apparatus of the present example in the same manner as in Example 1 in which the photoconductive member 13 is carried by a spring. Further, the panel 8 is inspected in the same manner as in Example 1.

Since the present example utilizes the repulsive force exerted between the two magnets to make the photoconductive member come into close contact with the liquid crystal display panel, the spring used in Example 1 is not necessary and, hence, a decrease in the biasing force of the spring due to prolonged use thereof will never occur. In addition, the black magnets also serves as the light-absorptive layer which would be provided on the bottom surface of the photoconductive layer to decrease the blackness of the scattering-type liquid crystal display panel in the transmissive condition and thereby enhance the contrast of the displayed image. This results in the inspection apparatus having a decreased number of parts.

Example 8

Figure 13:
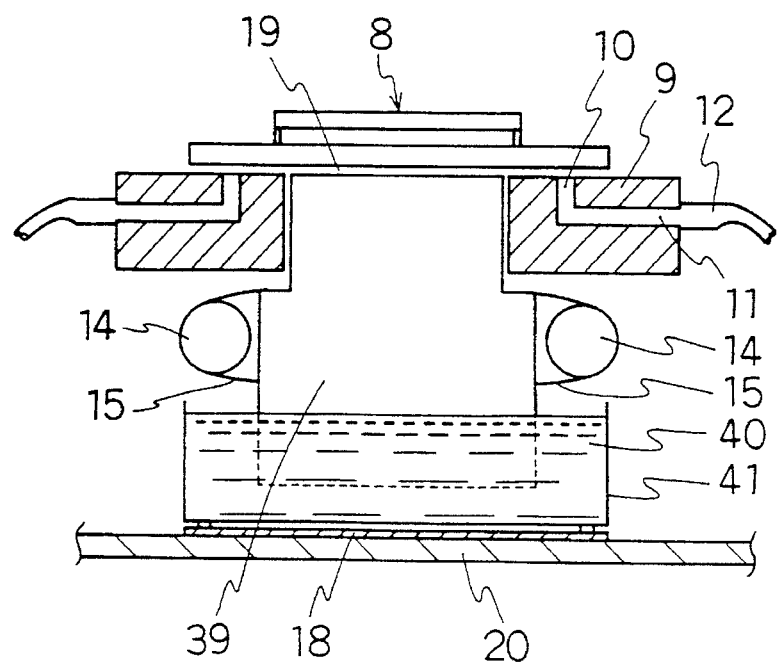
FIG. 13 is a sectional view of the chuck unit of Example 8 of the inspection apparatus according to the present invention.

FIG. 13 is a sectional view of the chuck unit of eighth example of the apparatus according to the present invention. In FIG. 13, numeral 8 denotes a scattering-type liquid crystal display panel to be inspected, and like numerals 9–12, 14, 15 and 19 are used to denote same parts of Example 1. A transparent photoconductive member 39 is formed of polymethylpentene having a specific gravity of 0.84 g/cm$^3$ and a refractive index of 1.47. A tranparent tank 41 is filled with water 40 and is provided with a black velvet cloth 18 on an outer surface of the bottom thereof with an air layer intervening therebetween. The photoconductive member 39 on which a light source 14 is mounted is adapted to float on the water 40 with a lower portion thereof immersed therein. The tank 41 functions as the pressing means to press the photoconductive member by adjusting the level of the water therein. The top surface of photoconductive member 39 projects beyond the flat surface of the table 9 by about 1 mm when in unloaded condition while, when in slightly loaded condition, it lowers to the same level as the flat surface of the table 9. The clearance defined between the convex portion of the photoconductive member 39 and the opening portion of the table 9 is set 0.5 mm or less. The photoconductive member 39 is adapted to rise and lower perpendicularly to the surface of the liquid crystal display panel 8.

In this example since the photoconductive member 39 having a specific gravity of 0.84 g/cm$^3$ is partially immersed in the water of which level is appropriately adjusted, the buoyancy of the photoconductive member 39 against the water allows the top surface thereof to be biassed to be closely contact with the panel surface of the liquid crystal display panel 8. The liquid crystal display panel 8 is positioned on the inspection apparatus of this example in the same way as in Example 1 using the spring for supporting the photoconductive member.

Since the present example utilizes the buoyancy of the photoconductive member 39 against the water to biass the liquid crystal display panel 8 and photoconductive member 39 so as to be closely contact with each other, the spring used in Example 1 is dispensed with and, hence, a decrease in the biasing force of the spring due to prolonged use thereof will never occur. The biasing force which presses the photoconductive member 39 against the liquid crystal display panel 8 is adjusted only by appropriately adjusting the level of the water on which the photoconductive member 39 is floating. Hence, the photoconductive member 39 and the liquid crystal display panel 8 can assuredly be biassed to be closely contact with each other with ease, resulting in a high visuality for inspection.

It should be appreciated that this example has the photoconductive member formed of polymethylpentene which floats on water, any other materials are usable for the photoconductive member and the liquid used as far as the photoconductive member and the liquid are in such a specific gravity relationship that the photoconductive member floats on the liquid and are substantially equal in refractive index to the substrates of the liquid crystal display panel.

Example 9

Figure 14:
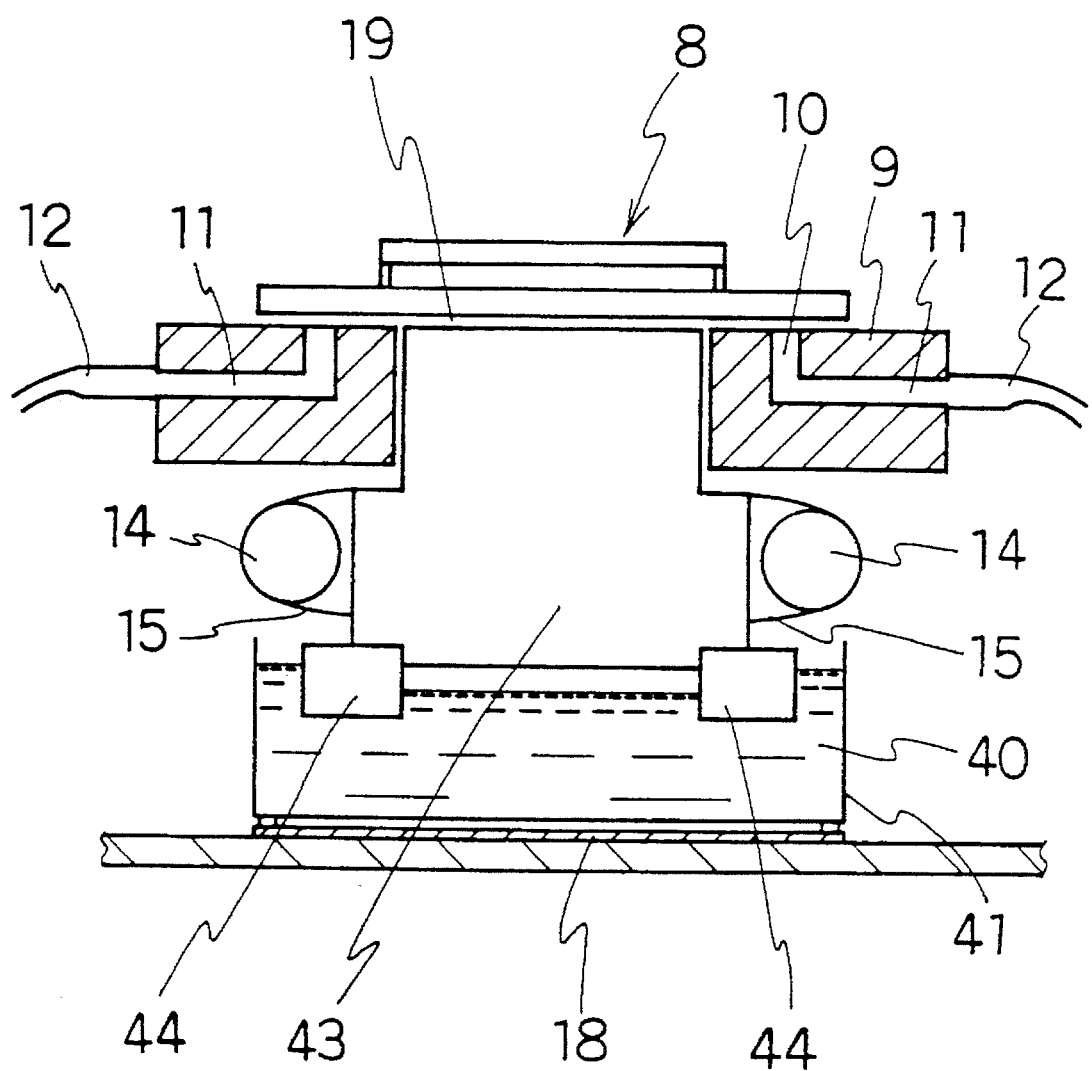
FIG. 14 is a sectional view of the chuck unit of Example 9 of the inspection apparatus according to the present invention.

FIG. 14 is a sectional view of the chuck unit of ninth example of the apparatus according to the present invention. In FIG. 14, numeral 8 denotes a scattering-type liquid crystal display panel to be inspected, and same numerals 9–12, 14, 15, 18 and 19 are used to denote same parts of Example 1.

Similarly, same numeral 41 is used denote same part of Example 8. A photoconductive member 43 is formed of a transparent acrylic resin. A polystyrene foam member 44 is provided around the bottom of the photoconductive member 43 and serves to make the photoconductive member 43 mounted with a light source 14 float on water 40.

In the present example the ON-OFF inspection is performed in substantially the same manner as in Example 8. Since the photoconductive member 43 is made to float on water using the buoyancy of the polystyrene foam member 44, the photoconductive member 43 can be formed of an inexpensive transparent acrylic resin.

Although the present example uses the polystyrene foam member as the means for making the photoconductive member of acrylic resin float on water, it is possible to use a vinyl or rubber tube sealingly containing air therein.

Example 10

Figure 15:
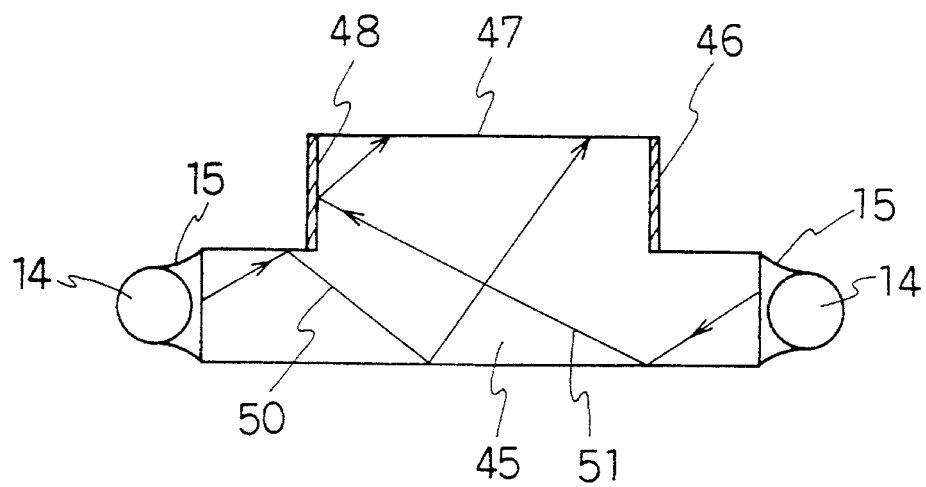
FIG. 15 is a sectional view of the transparent photoconductive member forming part of the chuck unit of Example 10 of the inspection apparatus according to the present invention.

FIG. 15 is a sectional view of a photoconductive member forming part of the chuck unit of tenth example of the apparatus according to the present invention. In FIG. 15, a photoconductive member 45 functions like the photoconductive member of Example 1 and is mounted with a light source 14 on a side wall thereof, the light source 14 being embraced by a reflecting film 15. A reflecting plate 46 is provided on the side wall in portions where the reflecting film 15 is not disposed. The reflecting plate 46 is bonded to the photoconductive member 45 through a transparent adhesive or the like with its reflecting surface faced opposite to the photoconductive member 45. The configuration of Example 10 is the same as that of Example 1 except for the photoconductive member.

The operation of this example is as follows:

As described in Example 1, of the light rays which are emitted from the light source 14 and are incident on a side wall of the photoconductive member 45, light rays 50 reaching the surfaces perpendicular to the side wall are totally reflected thereat, advance within the photoconductive member 45 without outgoing therefrom, and reach the top surface 47 of the photoconductive member 45 closely contacting the liquid crystal display panel (not shown). On the other hand, of the light rays incident on the photoconductive member 45 light rays 51 reaching the surface 48 parallel to the incident surface are incident on the surface 48 at an incident angle of smaller than the critical angle and hence outgo from the photoconductive member 45 at a certain reflection angle. Since the reflecting plate 46 is provided on this surface 48 in the present Example, the light rays 51 are totally reflected thereat, advance straight again in the photoconductive member 45, and reach the top surface 47.

Since the present example is of an arrangment such that the reflecting plate 46 is bonded to portions other than covered by the reflecting film 15 used for the back light, the light from the light source 14 is guided toward the liquid crystal display panel 8 without outgoing from the side wall of the photoconductive member 45. Hence, the light of the light source 14 can be efficiently utilized, while a bright display image having a high contrast can be obtained.

Example 11

Figure 16:
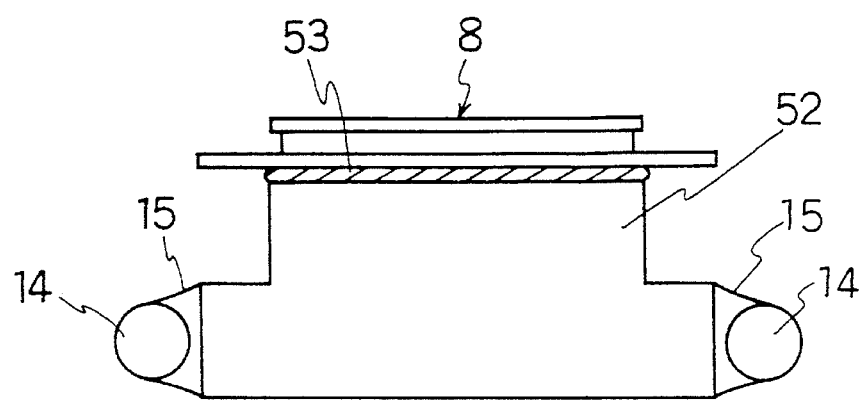
FIG. 16 is a sectional view of the transparent photoconductive member forming part of the chuck unit of Example 11 of the inspection apparatus according to the present invention.

FIG. 16 is a sectional view of a photoconductive member forming part of the chuck unit of eleventh example of the apparatus according to the present invention. In FIG. 15, numeral 8 denotes a scattering-type liquid crystal display panel, numeral 52 a photoconductive member 45 which functions as the photoconductive member of Example 1, and numeral 53 denotes a transparent resilient layer of about 2 mm thickness which is fixedly attached to the top surface of the photoconductive member 52 adapted to contact the liquid crystal display panel 8. The transparent resilient layer 53 is formed of, for example, a 2-component addition reaction type silicone RTV resin (KE1603A/B, a product of Shin-Etsu Chemical Co., Ltd.) and is fixedly attached to the photoconductive member 52 by applying such a resin material onto the top surface thereof and then drying the same. The photoconductive member 52 and the liquid crystal display panel 8 are made to closely contact each other with no intervention of an air layer therebetween by biassing the photoconductive member 52 against the liquid crystal display panel 8 from below through the transparent resilient layer 53 at an appropriate pressure. Although this example is the same as Example 1 in arrangement except for the transparent photoconductive member 52, no water is provided between the photoconductive member 52 and the liquid crystal display panel 8.

As in Example 1, light from the light source 14 advances within the photoconductive member 52 and reaches the top surface thereof. Since the photoconductive member 52, transparent resilient layer 53 and the glass substrate of the liquid crystal display panel 8 have a substantially equal refractive index and no air layer is present between them, the light is able to reach the surface of the scattering-type liquid crystal display panel with little refraction. This allows the ON-OFF inspection of the liquid crystal display panel 8 to be performed in the same way as in Example 1.

Since the present example has the transparent resilient layer 53 fixedly attached to the top surface of the photoconductive member 52, the liquid crystal display panel 8 and the photoconductive member 52 are completely closely contacted with each other with no intervention of an air layer therebetween without using a liquid such as water. Accordingly, the present example does not require a step of dropping water on the top surface of the photoconductive member for each inspection of liquid crystal display panel, the inspection is performed rapidly. Further, there is no fear of corrosion occurring on the inspection apparatus due to water and, hence, the apparatus is able to perform a prolonged lifetime.

Example 12

Figure 17:
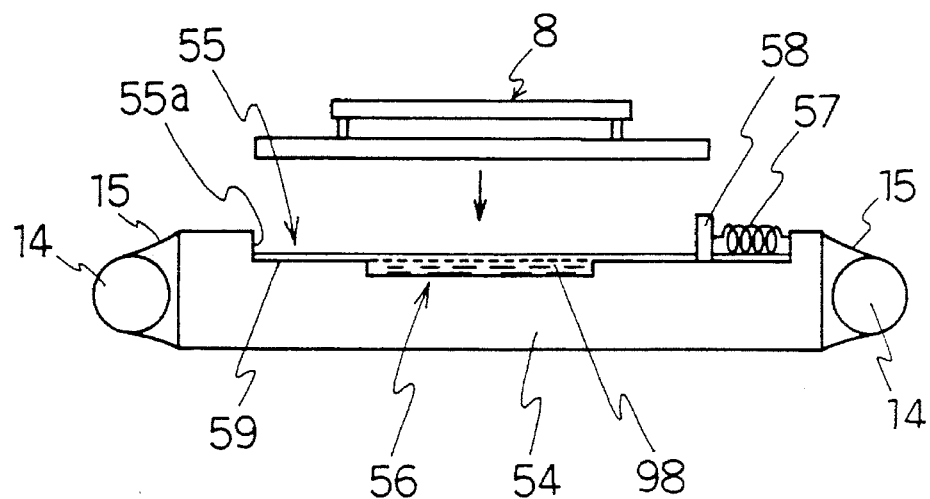
FIG. 17 is a sectional view of the transparent photoconductive member forming part of the chuck unit of Example 12 of the inspection apparatus according to the present invention.
Figure 18:
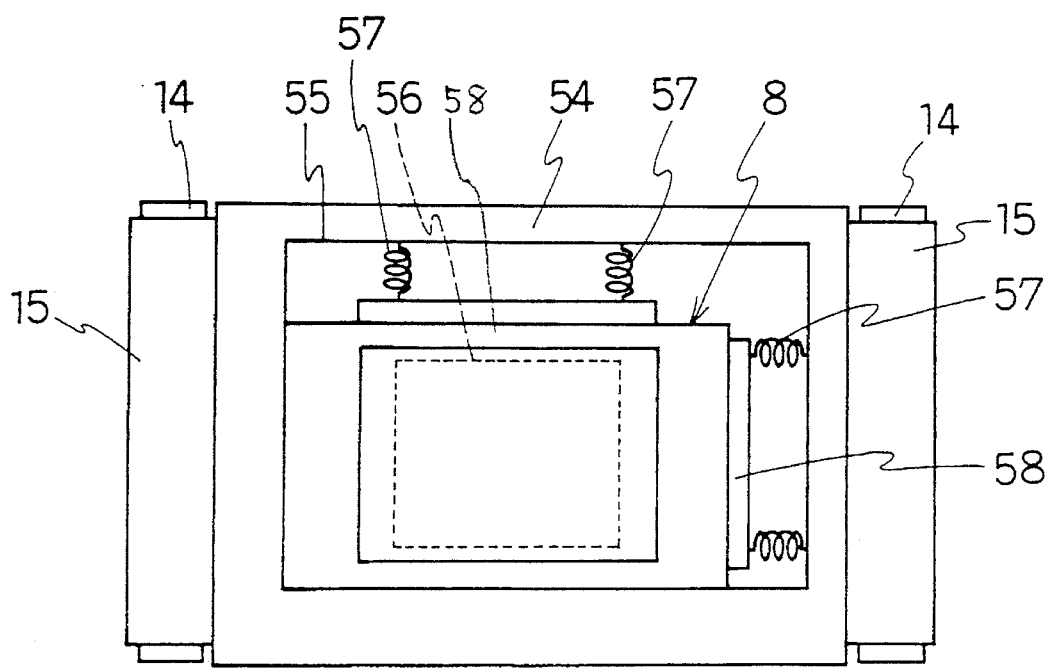
FIG. 18 is a plan view of the transparent photoconductive member shown in FIG. 17.

FIG. 17 is a sectional view of a photoconductive member forming part of the chuck unit of twelfth example of the apparatus according to the present invention, and FIG. 18 illustrates the photoconductive member in section. In FIGS. 17 and 18, numeral 8 denotes a scattering-type liquid crystal display panel and numeral 54 denotes a photoconductive member body of an acrylic resin, on the top surface of which are defined in tier two recesses 55 and 56. The recess 55 is about 2 mm deep and has a size larger than the outer size of the liquid crystal display panel 8 by 20 mm in both length and width. Recess 56 is about 2 mm deep and has a size larger than the image display part of the liquid crystal display panel 8 and smaller than the recess 55. Presser plates 58 each having a spring 57 are respectively provided on perpendicularly crossing two sides of the recess 55. The cavity defined by the recesses 55 and 56 is filled with high purity water 98 of which level is adjusted as being about 0.5 mm higher than the bottom of the recess 55. The present example is similar in configuration to Example 1 except for the chuck unit.

In this example, the cavity defined by the recesses 55 and 56 is first filled with the high purity water, and then the liquid crystal display panel 8 is coming into contact with walls 55a of the recess 55 which are free of the presser plate 58 and is gently laid on the bottom 59 while the presser plates 58 are biassed toward the corresponding walls of the photoconductive member 54. The presser plates 58 are then released to make the liquid crystal display panel 8 fixedly closely contact the walls 55a of the recess 55. In the same way as in Example 1, light from the ligh source 14 advances within the photoconductive member 54. The light reaching the recesses 55 and 56 runs straight with little refraction and reaches the surface of the liquid crystal display panel 8 since the refractive index of the high purity water 98 is substantially equal to that of the photoconductive member 54. The succeeding operation is performed in the same way as in Example 1 to carry out the ON-OFF inspection on the liquid crystal display panel 8.

As described above, since the present example is of the arrangement having the photoconductive member 54 defining two recesses in tier which are filled with high purity water, the present example dispenses with a step of dropping water by means of an injector and is capable of biassing the liquid crystal display panel 8 and the photoconductive member 54 so as to be closely contact with each other with no formation of an air layer therebetween. Furthermore, there is no apprehension that a fine particle which may be present between the photoconductive member and the liquid crystal display panel would damage them.

Example 13

Figure 19:
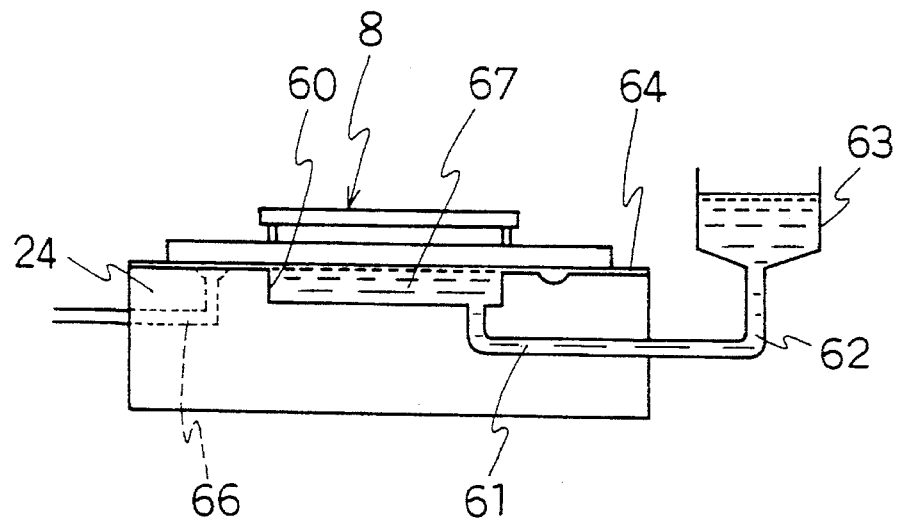
FIG. 19 is a sectional view of the transparent photoconductive member forming part of the chuck unit of Example 13 of the inspection apparatus according to the present invention.
Figure 20:
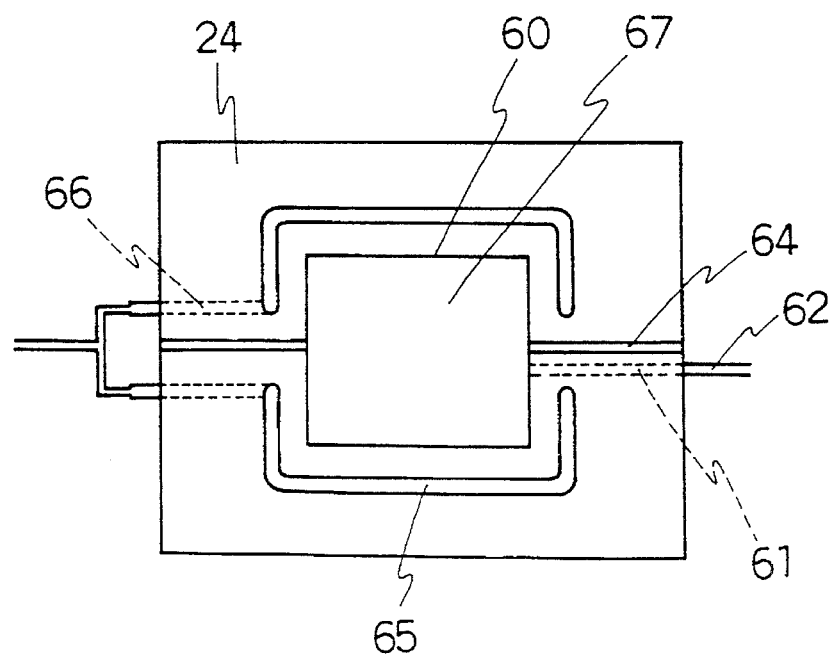
FIG. 20 is a plan view of the transparent photoconductive member shown in FIG. 19.

FIG. 19 is a sectional view of a photoconductive member forming part of the chuck unit of thirteenth example of the apparatus according to the present invention, and FIG. 20 is a top plan view of the photoconductive member. In FIGS. 17 and 18, numeral 8 denotes a scattering-type liquid crystal display panel and numeral 24 denotes a photoconductive member body of an acrylic resin, on the top surface of which is defined a rectangular tank-like cavity 60 having a depth of 5 mm and a size slightly larger than the image display area of the panel 8. The cavity communicates with an external tank 63 through a tunnel defined inside the photoconductive member 24 and a pipe 62. These cavity 60 and tank 63 are filled with high purity water 67. Two air vent grooves 64 of 0.5 mm depth and 3 mm width are defined in the top surface of the photoconductive member 24 as connected to the cavity 60 so as to communicate with the outside. Further, two U-shaped grooves 65 for reducing pressure are defined in the top surface of the photoconductive member 24 as surrounding the cavity 60. These grooves 65 each are 3 mm wide and 2 mm deep and are connected to an external pump (not shown) for reducing pressure through tunnels 66 defined inside the photoconductive member 24. On a side wall of the photoconductive member 24 is mounted a light source (not shown) similar to that of Example 1. The photoconductive member 24 is fixed to the bottom plate (not shown) of the chuck unit. The present example is similar in arrangment to Example 1 except for the chuck unit.

The ON-OFF inspection on the liquid crystal display panel with the present example is as follows:

Initially the water level of the external tank 63 is lowered to adjust the water level of the high purity water 67 in the cavity 60 to be lower than the top surface of the photoconductive member 24 by 1 mm or more. Then, the liquid crystal display panel 8 is placed on the top surface of the photoconductive member 24. In turn, the pressure of the tunnels 66 are reduced by means of the pump for reducing pressure to draw the liquid crystal display panel 8 against the photoconductive member 24 by suction. Subsequently the water level of the external tank 63 is raised to expel air present between the high purity water 67 in the cavity 60 and the substrate of the liquid crystal display panel 8 to the outside of the photoconductive member 24 through the air vent grooves 64. The succeeding ON-OFF inspection operation is the same as in Example 1.

As described above, since the present example is of the arrangement wherein the cavity having the vent grooves 64 is defined in the top surface of the photoconductive member 64 and high purity water is supplied thereto from the external tank, the example does not require a step of dropping water using an injector and is capable of making the photoconductive member 24 closely contact the liquid crystal display panel 8 with no formation of air layer therebetween and removing it therefrom with ease.

Example 14

Figure 21:
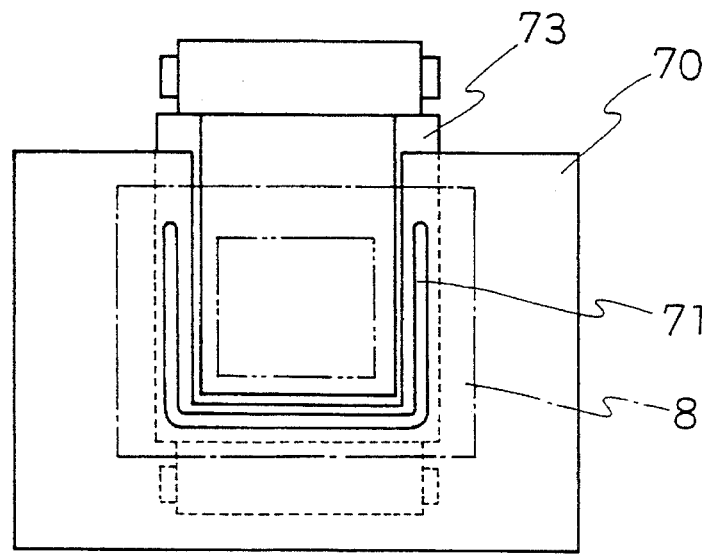
FIG. 21 is a plan view of the chuck unit of Example 14 of the inspection apparatus according to the present invention.
Figure 22:
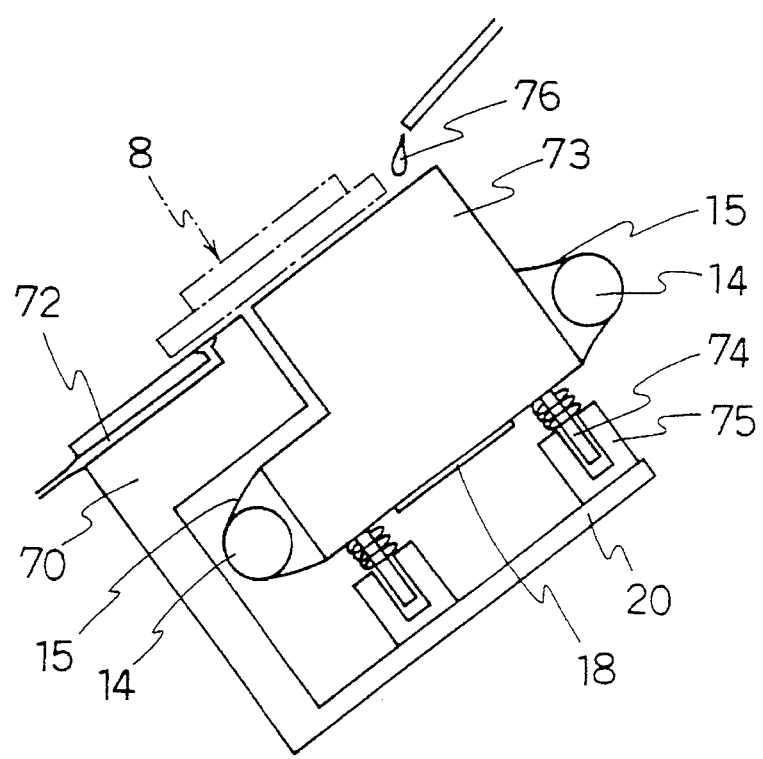
FIG. 22 is a sectional view of the chuck unit shown in FIG. 21.

FIG. 21 is a plan view partially showing the chuck unit of fourteenth example of the apparatus according to the present invention, and FIG. 22 is a sectional view of FIG. 21, as viewed from a lateral side thereof. In FIGS. 21 and 22, numeral 70 denotes a rigid table which is U-shaped when viewed from above and opened in an upper portion thereof. The opening defined by the table 70 is rectangular and slightly larger than the image display area (indicated by chain double-dashed line) of a liquid crystal display panel 8 (indicated by chain line). In the region defined between the opening and the contour of the display panel 8 (chain line) is formed a groove 71 of 3 mm width and 2 mm depth which is also U-shaped as surrounding the opening. The groove 71 is connected to a pump (not shown) for reducing pressure through a tunnel 72. A transparent photoconductive member 73 is formed of an acrylic resin and is L-shaped in section when viewed from a lateral side thereof. The photoconductive member 73 has a concave portion in the upper portion thereof, the top surface of the concave portion being of rectangular shape which is slightly smaller in width than the opening of the table 70 and larger in length than the opening, the top surface being slightly larger than the image display area of the liquid crystal display panel 8. On the photoconductive member 73 are mounted a light source 14, reflecting plate 15 and light-absorptive layer 18. A strut 74 is fixed to the bottom of the photoconductive member 73, fitted into a spring, and inserted into a supporting member 75 fixed to a bottom plate of the chuck unit. The overall chuck unit is slanted at about 30° with respect to the horizontal plane.

The ON-OFF inspection on the liquid crystal display panel 8 in the present example is performed in the following manner. Initially, the pump for reducing pressure is actuated and the liquid crystal display panel 8 is positioned on the table 70 as covering the U-shaped groove 71. The panel 8 is then pressed against the flat surface of the table 70 to slightly depress the photoconductive member 73, thereby drawing the panel 8 against the table 70 by suction. Then, several drops of high purity water 76 are provided by a dropping pipet around the edge of the panel 8 contacting the photoconductive member 73 on the side where the photoconductive member 73 is laterally extended beyond the panel 8. The high purity water 76 penetates into the overall interface between the panel 8 and the photoconductive member 73 by capillary activity, so that the panel 8 and the photoconductive member 73 are closely contacted with each other with no formation of air layer therebetween. The succeeding procedure of the ON-OFF inspection is the same as in Example 1.

As described above, the present example is of the arrangement wherein the rigid table 70 for fixing the liquid crystal display panel thereto is U-shaped and the photoconductive member 73 has a portion extending laterally beyond the contour of the liquid crystal display panel 8. Hence, it is possible to make the liquid crystal display panel 8 and the photoconductive member 73 come into close contact with each other with no formation of air layer therebetween by providing high purity water dropwise on the laterally extending portion after positioning the panel 8. This allows the placement of the panel to be considerably facilitated and permits an operator to conduct the ON-OFF inspection of the panel as seated on a chair.

Example 15

Figure 23:
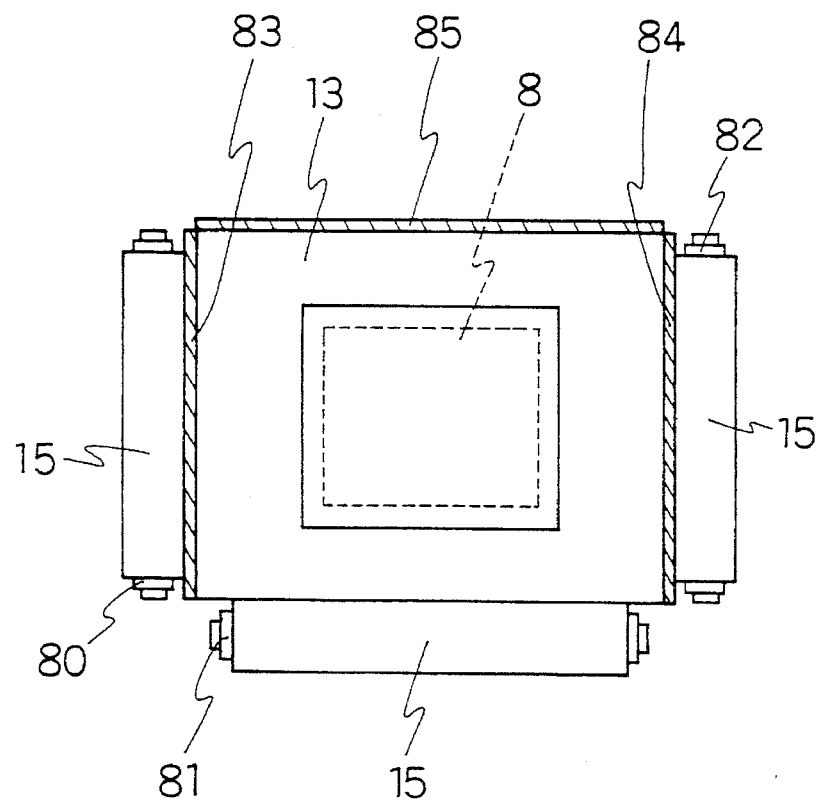
FIG. 23 is a plan view of the transparent photoconductive member forming part of the chuck unit of Example 15 of the inspection apparatus according to the present invention.

FIG. 23 is a top plan view showing part of the chuck unit of fifteenth example of the apparatus according to the present invention. In FIG. 23 numeral 13 denotes a transparent photoconductive member shaped rectangular as viewed from above and convex in section, and numeral 8 denotes a scattering-type liquid crystal display panel contoured by broken line. On opposite lower side walls of the photoconductive member 13 are respectively mounted a cold cathode 80 as a light source to emit red light and a cold cathode 82 as light source to emit blue light, each of these cathodes being embraced by a reflecting plate 15. Further, on each of the other two side walls is internally mounted a cold cathode 81 as a light source to emit green light which is embraced by a reflecting plate 15. On the side wall of the photoconductive member 13 where the cold cathode 80 for red light is mounted is bonded a dichroic mirror 83 adapted to reflect blue light. On the side wall of the photoconductive member 13 where the cold cathode 82 for blue light is mounted is bonded a dichroic mirror 84 adapted to reflect red light. Further, on the side wall facing opposite to the side wall where the cold cathode 81 for green light is mounted is provided a mirror 85. The present example is similar in configuration to Example 1 except for the chuck unit.

The ON-OFF inspection on the liquid crystal display panel 8 in the present example is performed in the following manner. The liquid crystal display panel 8 is placed in the same way as in Example 1. Initially, when only the red light cold cathode 80 is lighted, red light passes through the dichroic mirror 83 and is incident on the photoconductive member 13. Of the incident light rays those reaching the mirror 85 or the dichroic mirror 84 on the opposite side are totally reflected thereby. Such red light rays then reach the display surface of the liquid crystal display panel 8 as in Example 1 and are utilized for ON-OFF inspection. Likewise, when only the blue light cold cathode 82 is lighted, the ON-OFF inspection for blue light is performed in a similar manner. When only the green light cold cathode 81 is lighted, green light from the light source is incident on the photoconductive member 13 and is totally reflected by the mirror 85, so that the ON-OFF inspection for green light is assured. When all the cold cathodes 80, 81 and 82 are lighted simultaneously, red, blue and green light rays are mixed to produce white light. Accordingly, the ON-OFF inspection for white light is performed.

As described above, the present example is of the arrangement wherein light sources for red light, blue light and green light are respectively disposed on three side walls of the photoconductive member 13 and the dichroic mirrors are respectively disposed on opposite side walls to reflect light of the corresponding color coming from the opposite side wall. This allows evaluation on the display characteristics of a scattering-type liquid crystal display panel with respect to light rays of different wavelengths.

Example 16

Figure 24:
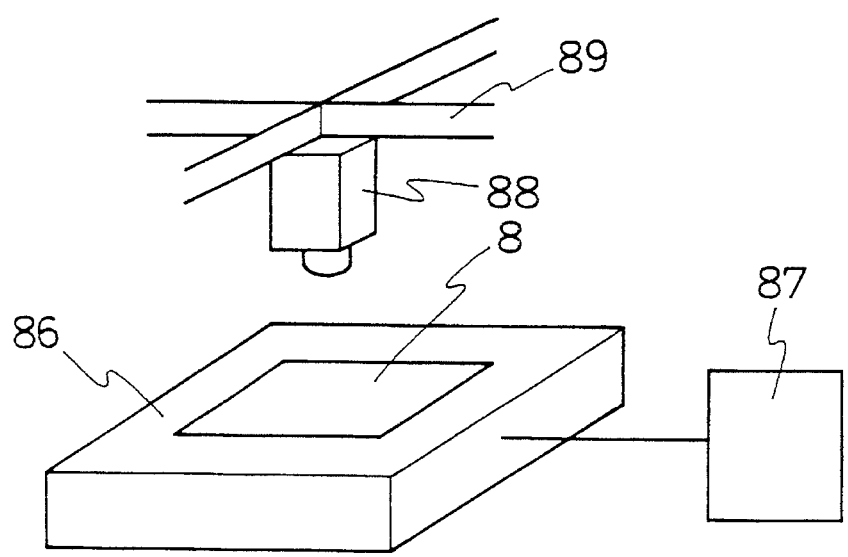
FIG. 24 is a schematic view illustrating the construction of Example 16 of the inspection apparatus according to the present invention.

FIG. 24 is a schematic illustration of the configuration of sixteenth example of the ON-OFF inspection apparatus for a scattering-type liquid crystal display panel according to the present invention. Numeral 8 denotes a scattering-type liquid crystal display panel, and numeral 86 denotes an inspection apparatus body. A signal applying means 87 is capable of controlling an effective voltage to be applied to PDLC of all or part of pixels of the liquid crystal display panel 8. A luminance meter 88 is provided to measure the luminance of pixels in a certain part of the panel 8. An X–Y stage 89 is capable of moving the luminance meter 88 parallel to the plane of the image display area of the panel 8.

Figure 25:
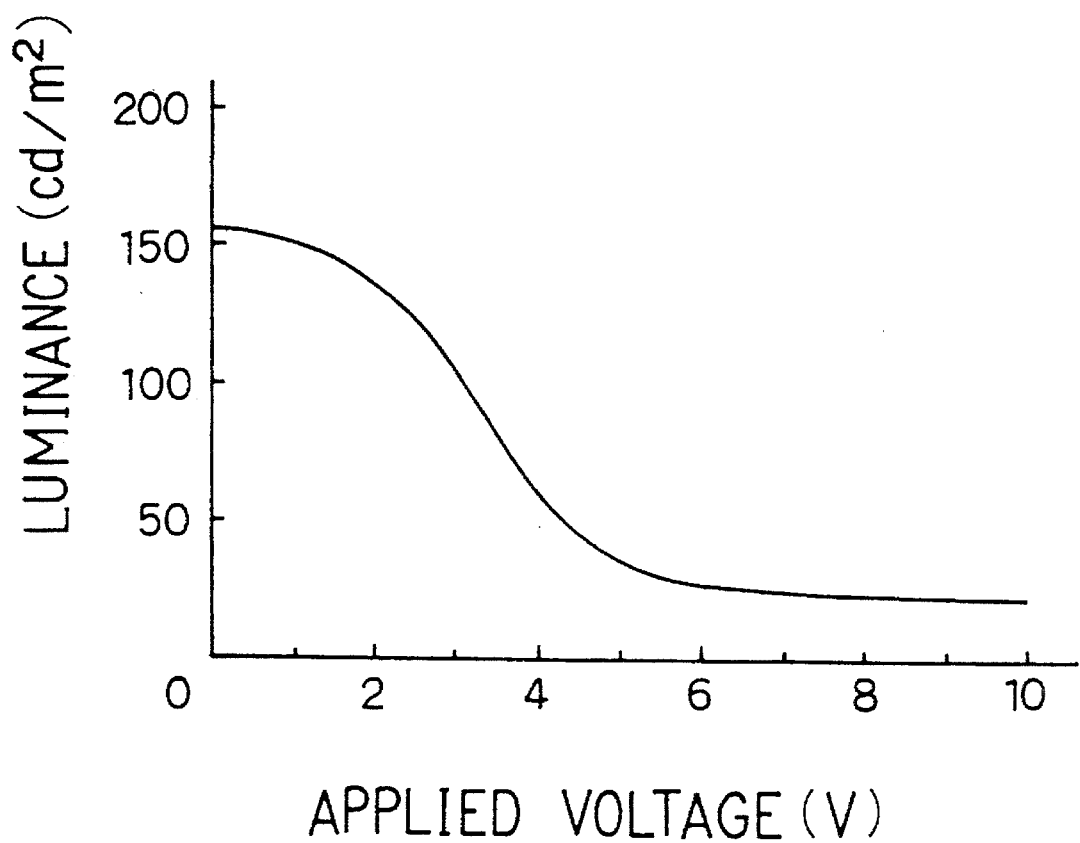
FIG. 25 is a graphic representation of the voltage-luminance characteristic curve of a scattering-type liquid crystal display panel measured by Example 16 of the inspection apparatus according to the present invention.
Figure 26:
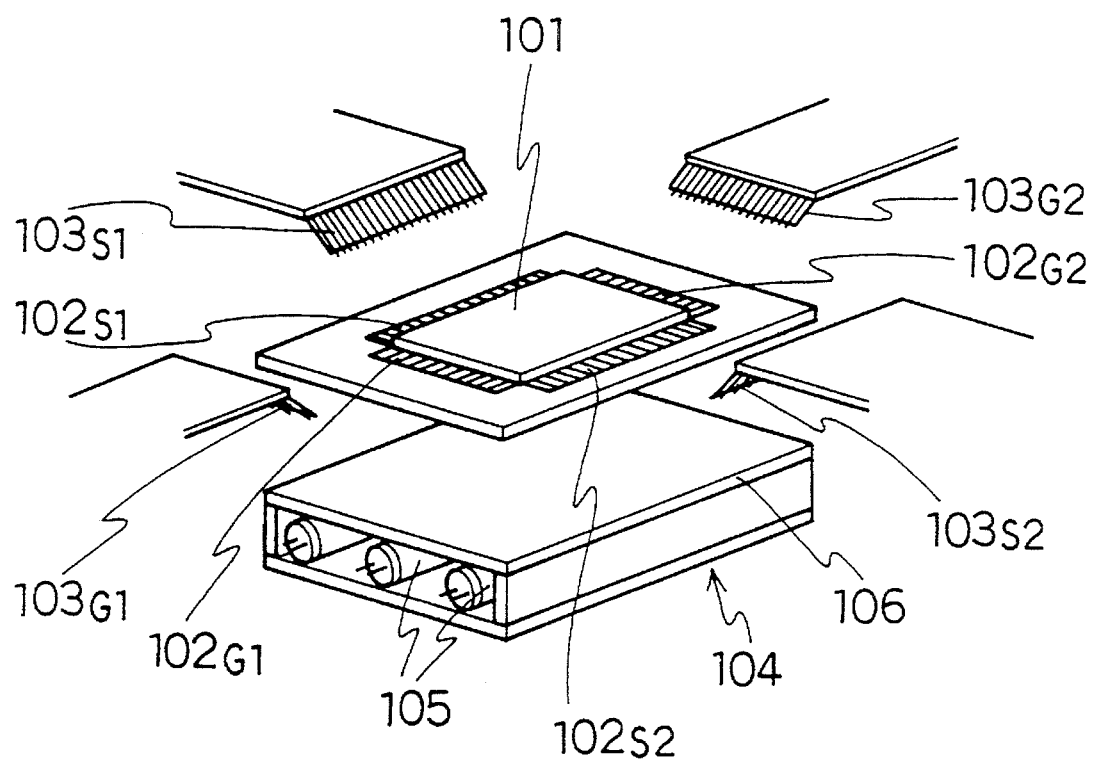
FIG. 26 is a schematic illustration of a part of a conventional inspection apparatus.
Figure 27:
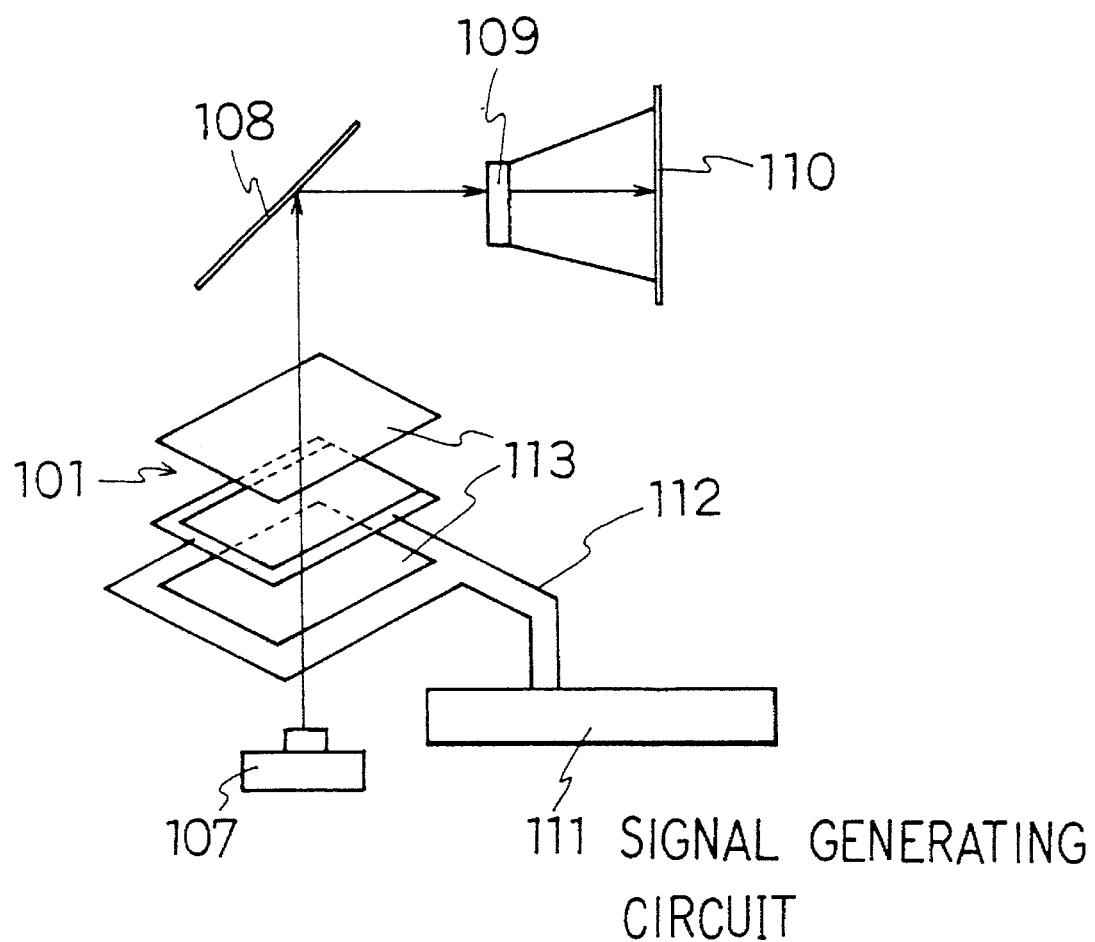
FIG. 27 is a schematic illustration of the construction of the conventional inspection apparatus.

FIG. 25 is a voltage-luminance charateristic curve of a reference scattering-type liquid crystal display panel measured by this measuring system prior to the ON-OFF inspection on an active or simple matrix display panel 8. The reference liquid crystal display panel is of the arrangement wherein PDLC is sealedly provided between a pair of substrates each formed with a light-shielding film and a transparent electrode covering the entire surface. The voltage applied has an amplitude of 30 Hz. As understood from FIG. 25, there is a certain relationship between the voltage applied across the PDLC and the luminance. It should be noted that the scattering-type liquid crystal used in the reference liquid crystal display panel and the gap defined between the substrates are same as those of the liquid crystal display panel 8 to be inspected.

The ON-OFF inspection on the scattering-type liquid crystal display panel 8 in the present example is performed in the following manner. Initially, the signal applying means 87 applies a signal of a certain voltage to the panel 8 placed in the same manner as in Example 1. The visual field of the luminance meter 88 is moved to a pixel portion applied with the signal to read the luminance value. By comparing this luminance value with the corresponding value on the vertical axis of the voltage-luminance characteristic curve shown in FIG. 25, the corresponding voltage on the horizontal axis is read. This makes it possible to infer the voltage actually applied to the PDLC of the aforementioned pixel portion of the liquid crystal display panel 8. Accordingly, with an active matrix liquid display panel driven by TFT, for example, the difference in TFT characteristics among TFTs can be grasped. Alternatively, instead of the luminance meter 88 there may be used a TV camera whose luminance scale is adapted for the aforementioned voltage-luminance characteristic curve to measure the luminance distribution in whole or partial area of the image display part of the liquid crystal display panel, thereby detecting the TFT characteristic distribution in the display area. Further, several kinds of reference panels having different gaps may be measured for gap-luminance characteristics at a constant voltage to provide a gap-luminance characteristic curve instead of the voltage-luminace characteristic curve of FIG. 25. By detecting luminance values at that voltage using the luminance meter or TV camera, gap values or a gap value distribution can also be detected.

As described above, the present example is of the arrangement including the signal applying means for varying the effective voltage applied to a pixel portion and means for detecting the luminance of the pixel portion. This makes it possible to detect the optical response characteristics of a pixel portion. In addition, one is able to recognize the TFT characteristics of a certain pixel, a value of the gap defined between two opposing substrates of a panel, and a distribution of the TFT characteristics or gap value in the image display area.

The inspection apparatus according to the present invention is configured as described above and hence offers the following advantages.

When the inspection apparatus is of the arrangement wherein a flat photoconductive member having a light source on each side wall thereof is adapted to closely contact a liquid crystal display panel and a light-absorptive layer is provided on the bottom of the flat photoconductive member, the ON-OFF inspection on a scattering-type liquid crystal display panel can be performed by directly viewing the panel on the inspection apparatus without using a projection optical system. This results in the inspection apparatus of reduced size which does not require optical adjustments such as focusing.

When the inspection apparatus has a feature that a support means comprises a rigid body having an opening in a supporting surface parallel to the panel surface for carrying a liquid crystal display panel and a photoconductive member is provided in the opening of the rigid body and is adapted to be pressed against the liquid crystal display panel by pressing means, the panel can be positioned on the rigid body with high precision while being able to closely contact the photoconductive member. This assures a display image of high visuality. In addition, since the liquid crystal display panel is biassed so as to be closely contact with the photoconductive member only when inspected, the placement of the panel on the inspection apparatus and its removal therefrom are achieved with ease.

When the inspection apparatus has a feature that a portion for reducing pressure is provided within a rigid body adapted to support a liquid crystal display panel and a negative pressure is provided through the portion for reducing pressure to fix the panel on the rigid body, the panel can be fixedly positioned with higher precision and removed from the apparatus with ease for the succeeding inspections.

When the inspection apparatus has a feature that a hollow portion is provided within a flat photoconductive member for fixing a liquid crystal display panel onto the table utilizing a negative pressure provided through the depressurizing portion, the interface between the panel and the photoconductive member is registered with the surface to which the panel is fixed. This results in the inspection apparatus of very simplified structure and assures a high contact precision.

When the inspection apparatus has a feature that a flat photoconductive member comprises a transparent rigid material and a transparent resin, the inspection apparatus enables a liquid crystal display panel to be fixedly positioned thereon with high precision and makes the photoconductive member hard to damage by frequent placement and removal of the panel. In addition, the apparatus will perform a prolonged lifetime and a lighter weight.

When the inspection apparatus has a feature that a flat photoconductive member comprises a thick portion which is thicker than the rest and which corresponds to the image display area of a liquid crystal display panel, the photoconductive member provides an enlarged area for the mounting of light sources and light-absorptive layer. This leads to a higher degree of freedom in installing the inspection apparatus.

When the inspection apparatus has a feature that a flat photoconductive member has a thick portion of which side walls are covered with a reflecting plate having a reflecting surface facing the photoconductive member, light from a light source which is reflected by the reflecting plate is also guided to the image display area of a liquid crystal display panel. This enables light from the light source to be highly efficiently utilized and an image to be displayed with high luminance and hence assures enhanced visuality for inspection.

When the inspection apparatus has a feature that panel support means is formed on a surface of flat photoconductive member which is parallel to the image display surface of a liquid crystal display panel and has a portion extending laterally beyond the panel when viewed in section parallel to the image display surface of the panel, it is possible to make the panel and the photoconductive member come into close contact with each other without forming air layer therebetween and to make the panel slanted with respect to the horizontal plane. This allows an operator to conduct inspection on the panel as seated on a chair.

When the inspection apparatus has a feature that a transparent liquid is provided intermediate between a flat photoconductive member and a liquid crystal display panel, the photoconductive member and the panel is able to be brought into close contact with each other with no formation of air layer therebetween, resulting an image displayed with enhanced visuality. In addition, even if a fine abnormal particle is present between the panel and the photoconductive member, the photoconductive member and the panel are less likely to be damaged due to the fine abnormal particle.

When the inspection apparatus has a feature that a transparent resilient member is provided between a flat photoconductive member and a liquid crystal display panel, the photoconductive member and the panel are able to be fixedly coming into close contact with each other with no formation of air layer therebetween, without requiring a step of dropping a transparent liquid. This results in a shortened time period required for placing or positioning the panel. In addition, there is no fear of corrosion occurring on the apparatus due to the transparent liquid, thus leading to a prolonged lifetime of the apparatus.

When the inspection apparatus has a feature that a small pit is defined in a flat surface of flat photoconductive member which is brought into contact with a liquid crystal display panel and is filled with a transparent liquid, it is possible to make the photoconductive member and the panel come into close contact with each other with no formation of air layer therebetween without requiring a step of dropping a transparent liquid. In addition, even if a relatively large abnormal particle is present between the photoconductive member and the panel, the photoconductive member and the panel are less likely to be damaged by the abnormal particle. This leads to a prolonged lifetime of the apparatus and to improved quality of the liquid crystal display panel.

When the inspection apparatus has a feature that a liquid supply path is provided to a small pit defined in a flat photoconductive member and an air vent groove is defined in a flat surface of the photoconductive member which is adapted to contact a liquid crystal display panel, it is possible to make the photoconductive member and the panel come into close contact with each other with no formation of air layer therebetween, without requiring a step of dropping a transparent liquid. In addition, the inspection requires less time period.

When the inspection apparatus has a feature that light sources for providing light rays of different colors are provided on side walls of a flat photoconductive member and a dichroic mirror is provided on each of the side walls for reflecting light rays of the corresponding color, it is possible to evaluate the display characteristics of a scattering-type liquid crystal display panel with respect to light of different wavelengths. In particular, it is possible to inspect a liquid crystal display panel for use in a liquid crystal projector under conditions similar to actual use conditions.

When the inspection apparatus has a feature that there are provided signal applying means having voltage adjusting means adapted to vary the effective voltage applied to a pixel portion and means for measuring the luminance of the pixel portion, it is possible to recognize the TFT characteristics of a pixel, a gap value of the gap defined between the two substrates of a panel and a distribution of TFT characteristics or gap value in the panel plane.

While only certain presently preferred examples have been described in detail, as will be apparent from those familiar with the art, certain changes and modifications can be made without departing from the spirit and scope of the invention as defined by the following claims.

What is claimed is:

1. An apparatus for inspecting ON-OFF states of a scattering-type liquid crystal display panel, comprising:

support means for supporting the liquid crystal display panel;

signal applying means for applying an electric signal to a pixel of the liquid crystal display panel;

illumination means for illuminating the liquid crystal display panel, the illumination means comprising a flat photoconductive member and a light source mounted on a side wall of the photoconductive member;

a light-absorptive layer disposed on one side of the photoconductive member with a gap therebetween; and a means for biasing the other side of the photoconductive member so as to be closely contact with the liquid crystal display panel.

2. The apparatus of claim 1, wherein said support means comprises a rigid body having a rectangular opening in a central portion thereof adapted to receive said liquid crystal display panel, the rectangular opening being fitted around said flat photoconductive member; and wherein said means for biasing the other side of said photoconductive member so as to be closely contact with said liquid crystal display panel comprises pressing means for pressing said photoconductive member against said liquid crystal display panel.

3. The apparatus of claim 2, wherein said rigid body has a hollow portion surrounding said opening and is adapted to fix said liquid crystal display panel thereto by drawing said liquid crystal display panel against the rigid body by suction through the hollow portion.

4. The apparatus of claim 1, wherein said flat photoconductive member has a hollow portion through which said liquid crystal display panel is to be drawn against said photoconductive member by suction so as to be fixed thereto.

5. The apparatus of any one of claims 1, 2 and 4, wherein said flat photoconductive member comprises a transparent rigid material and a transparent resin.

6. The apparatus of any one of claim 5, wherein said photoconductive member has a portion corresponding to the image display area of said liquid crystal display panel, the portion being thicker than the rest of said photoconductive member.

7. The apparatus of claim 6, wherein said flat photoconductive member is provided with a reflecting plate disposed as surrounding side walls of the thicker portion with a reflecting surface thereof facing said photoconductive member.

8. The apparatus of claim 1, wherein said photoconductive member is adapted to come into close contact with said liquid crystal display panel through an intermediate transparent liquid.

9. The apparatus of claim 1, further comprising a transparent resilient member provided between said liquid crystal display panel and said flat photoconductive member.

10. The apparatus of claim 1, wherein said photoconductive member defines a recessed portion in a flat surface thereof adapted to contact said liquid crystal display panel, the recessed portion being adapted to be filled with a transparent liquid.

11. The apparatus of claim 10, said flat photoconductive member is provided with a supply path for supplying said transparent liquid to said recessed portion and defines an air vent groove in said flat surface thereof.

12. The apparatus of claim 1, wherein said support means comprises a rigid body having a U-shaped opening in a surface for receiving said liquid crystal display panel, the U-shaped opening being adapted to fit around said flat photoconductive member; and wherein said photoconductive member has a portion extending beyond said liquid crystal display panel in a placed position when viewed in section parallel to the plane of said liquid crystal display panel.

13. The apparatus of claim 1, wherein said light source comprises a plurality of different color light sources each mounted on one side wall of the flat photoconductive member; and wherein a dichroic mirror is disposed on a side wall of said photoconductive member in opposing relation to each of the color light sources so as to reflect the color light emitted from the light source on the opposite side wall.

14. The apparatus of any one of claim 1, further comprising means for measuring the luminance of said pixel, wherein said signal applying means is provided with voltage adjusting means for varying the effective voltage applied to said pixel.

* * * * *